(12) United States Patent
Feng et al.

(10) Patent No.: US 10,333,353 B2
(45) Date of Patent: Jun. 25, 2019

(54) OMNIDIRECTIONAL WIRELESS POWER TRANSFER SYSTEM

(71) Applicant: Virginia Tech Intellectual Properties, Inc., Blacksburg, VA (US)

(72) Inventors: Junjie Feng, Blacksburg, VA (US); Qiang Li, Blacksburg, VA (US); Fred C. Lee, Blacksburg, VA (US); Minfan Fu, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 167 days.

(21) Appl. No.: 15/417,353

(22) Filed: Jan. 27, 2017

(65) Prior Publication Data

US 2017/0222483 A1 Aug. 3, 2017

Related U.S. Application Data

(60) Provisional application No. 62/432,258, filed on Dec. 9, 2016, provisional application No. 62/288,860, filed on Jan. 29, 2016.

(51) Int. Cl.
*H02J 7/02* (2016.01)
*H02J 7/00* (2006.01)
*H02J 50/12* (2016.01)
*H02J 50/90* (2016.01)

(52) U.S. Cl.
CPC ........... *H02J 50/12* (2016.02); *H02J 7/0042* (2013.01); *H02J 7/025* (2013.01); *H02J 50/90* (2016.02)

(58) Field of Classification Search
CPC .......... H02J 7/0042; H02J 7/025; H02J 17/00; H02J 50/12; H02J 50/90
USPC ....................................................... 307/104
See application file for complete search history.

(56) References Cited

U.S. PATENT DOCUMENTS

2015/0188339 A1 7/2015 Green et al.

OTHER PUBLICATIONS

W. Ng, C. Zhang, D. Lin, and S. Hui, "Two- and three dimensional omnidirectional wireless power transfer," IEEE Trans. Power Electron., vol. 29, No. 9, 1)p. 4470-4474, Jan. 2014.

*Primary Examiner* — Hal Kaplan
(74) *Attorney, Agent, or Firm* — Thomas | Horstemeyer, LLP; John S. Sears; Jason M. Perilla

(57) ABSTRACT

In one example, an omnidirectional wireless power transfer system includes high frequency power generator configured to generate a supply of high frequency oscillating power, a number of transmitter-side resonant tank circuits electrically coupled to the high frequency power generator, a receptacle including a number of coils arranged for omnidirectional power transfer to an electronic device placed in the receptacle, and a controller configured to activate individual ones of the transmitter-side resonant tank circuits to wirelessly transmit power to the electronic device through near-field resonant inductive coupling. In one example, the receptacle can be embodied as a bowl, and the controller can activate individual ones of the transmitter-side resonant tank circuits over time to generate an omnidirectional field distribution for wireless power transmission. In other aspects, various transmitter-side and receiver-side tank circuits for coupling independent resonance and ZVS operation are described.

19 Claims, 26 Drawing Sheets

OMNIDIRECTIONAL WIRELESS POWER TRANSFER SYSTEM

CROSS-REFERENCE TO RELATED APPLICATIONS

This application claims the benefit of priority to U.S. Provisional Application No. 62/288,860, titled "Omnidirectional Wireless Power Transfer System," filed Jan. 29, 2016, and claims the benefit of priority to U.S. Provisional Application No. 62/432,258, titled "Resonant Topologies with Coupling Load Independent Resonance for Wireless Power Transfer Applications," filed Dec. 9, 2016, the entire contents of both of which applications are hereby incorporated herein by reference.

BACKGROUND

Wireless power or energy transfer is directed to the transmission of electrical energy from a power source to an electrical load without the use of conductors. Wireless power transfer can be achieved using a various power transmission technologies using time-varying electric, magnetic, or electromagnetic fields. Wireless power transfer can be particularly useful in situations where the use of conductors is inconvenient or dangerous, for example, to transfer power.

For near-field (i.e., non-radiative) wireless power transfer, inductive coupling is widely used and its applications include providing power to charge electric toothbrushes, radio-frequency identification (RFID) tags, smartcards, and implantable medical devices. Recently, more emphasis has been placed on the development of wireless power transfer systems for charging mobile and handheld computing devices.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

Near-field (i.e., non-radiative) wireless power transfer can be relied upon to transfer power in various applications or fields of use, such as in military, medical, consumer device, and automotive fields, among others. One challenge in the design of near-field wireless power transfer systems arises because the level of coupling between transmitter and receiver coils can vary. Particularly, the level of coupling can vary because there is no predefined physical connection or orientation between the transmitter and receiver coils. For example, in a wireless power transfer system where a user is expected to set or place a device upon a charging plate or base, the position and orientation of the receiver coil (with respect to the transmitter coil) is dependent on the user's placement of the device and will vary. Thus, the coupling coefficient between the transmitter and receiver coils is not fixed as in the conventional case where a transformer is used. Similarly, the load presented by the device can vary because the load presented by a battery can varies based on the different charging stages in the charging profile of the battery.

Many conventional non-radiative wireless power transfer platforms are designed to be directional, meaning that devices are charged efficiently only when placed in a predetermined orientation (or relatively narrow range of a few orientations). Small portable electronic devices can typically be placed near a wireless charging station in a number of different orientations, however, and some of those orientations may not be suitable for efficient wireless power transfer. Thus, a well-designed omnidirectional wireless power transfer system would be desirable for charging portable electronic devices.

Figure 1A:
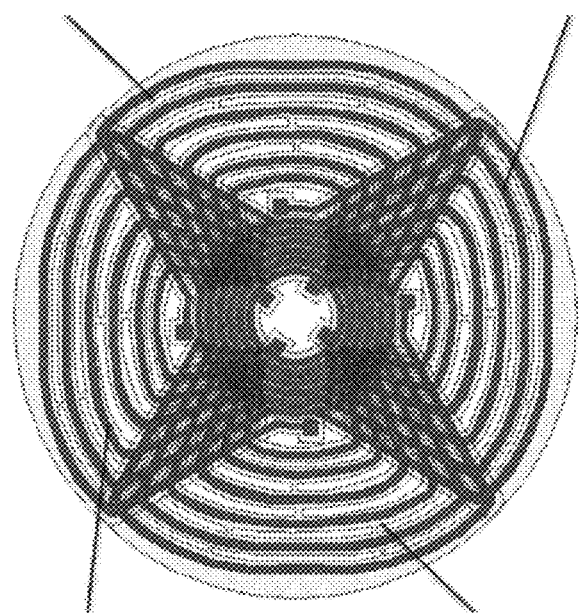
FIG. 1A illustrates an example of a number of coils arranged in a bowl according to various examples described herein.
Figure 1B:
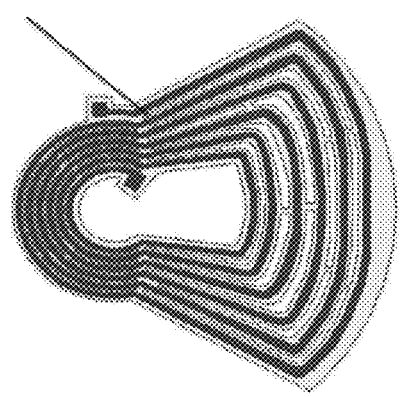
FIG. 1B illustrates one of the coils shown in FIG. 1A according to various examples described herein.

To illustrate the types of problems that can be encountered with conventional wireless power transfer platforms, a bowl for wireless charging was recently demonstrated. The bowl includes four coils for the transmission of power wirelessly. A top-down view of the four coils arranged (e.g., embedded) in the bowl is shown in FIG. 1A, and one of the coils is shown in FIG. 1B. A bowl including the coils shown in FIG. 1A provides magnetic field in more than one direction, including a component of vertical field from the center of the bottom of the bowl (i.e., from the overlapping combination of coils at the center of the bottom of the bowl) and a number of components of relatively perpendicular field from the side surfaces of the bowl (i.e., a perpendicular component for each coil). However, the magnetic field distribution in the bowl is not omnidirectional even at the bottom of the bowl.

Figure 2A:
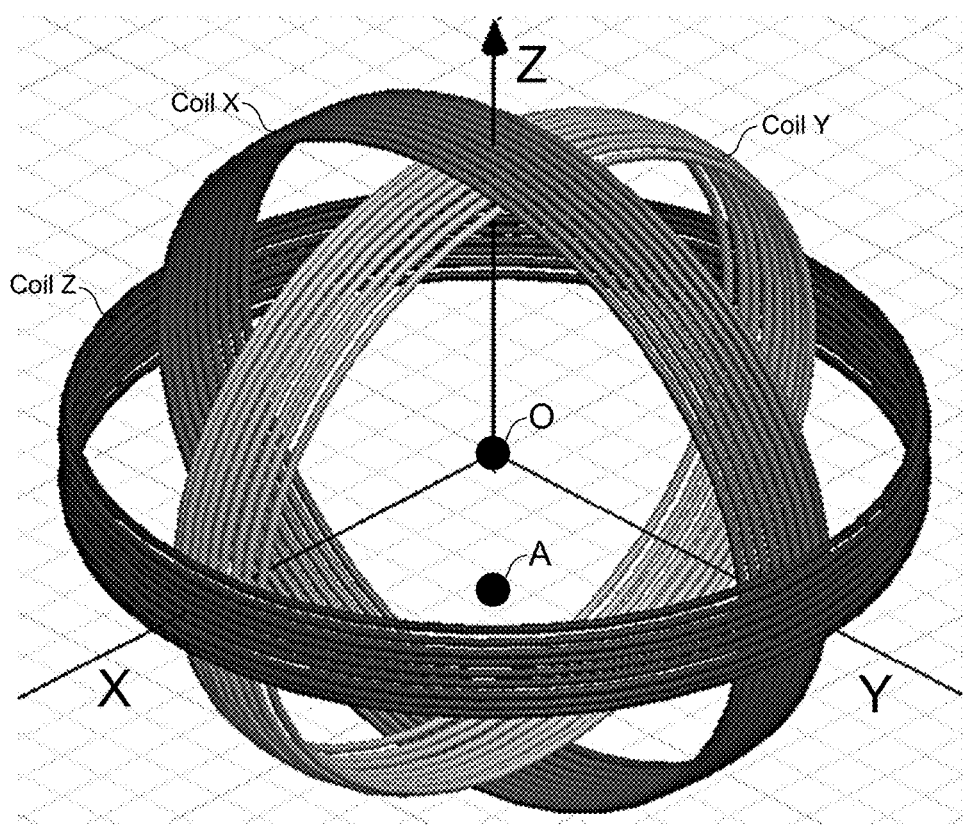
FIG. 2A illustrates an example wireless power transfer platform with three orthogonal, symmetric coils according to various examples described herein.
Figure 2B:
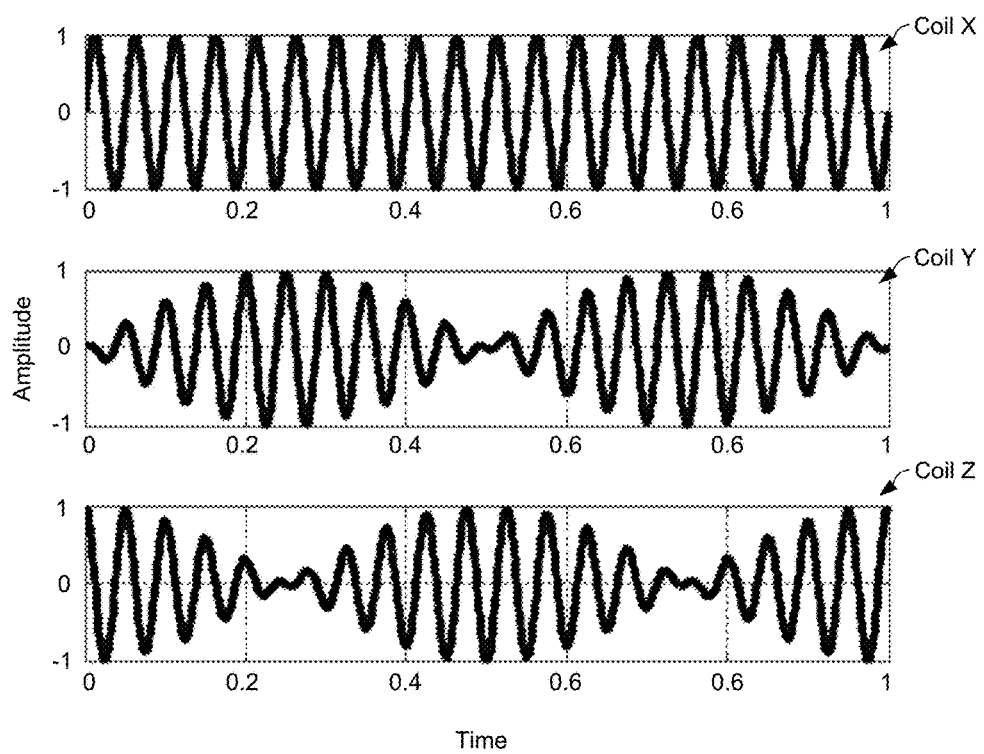
FIG. 2B illustrates example excitation waveforms applied the orthogonal, symmetric coils X, Y, and Z shown in FIG. 2A, respectively, according to various examples described herein.

An example of another wireless power transfer platform with three orthogonal, symmetric coils, coil X, coil Y, and coil Z, is shown in FIG. 2A. In one example case, the excitation waveforms applied to coil X, coil Y, and coil Z, respectively, are shown in FIG. 2B and in expressions (1)-(3) below. The amplitude of the excitation current of coil Y and coil Z is modulated by relatively low frequency sinusoidal waveforms.

$$I_x = I_m \sin(\omega t) \quad (1)$$

$$I_y = I_m \sin(\omega_2 t)\sin\left(\omega t + \frac{\pi}{2}\right) \quad (2)$$

$$I_z = I_m \sin\left(\omega_2 t + \frac{\pi}{2}\right)\sin\left(\omega t + \frac{\pi}{2}\right) \quad (3)$$

With these excitation currents, magnetic field induced at a center of the three symmetric coils can be expressed as:

$$\vec{B}_x = \frac{u_0}{2R}I_x\vec{x}, \ \vec{B}_y = \frac{u_0}{2R}I_y\vec{y}, \ \text{and} \ \vec{B}_z = \frac{u_0}{2R}I_z\vec{z}, \text{where} \quad (4)$$

$u_0$ is vacuum permeability, $\vec{x}$, $\vec{y}$, $\vec{z}$ is the standard basis vector, and R is the radius of the coils.

The total magnetic field induced at the center by three coils can be calculated as:

$$\vec{B}_t = \vec{B}_x + \vec{B}_y + \vec{B}_z. \quad (5)$$

The total magnetic field at the center of the three symmetric coils is a time-varying vector, and the magnitude is constant according to expression (6) as:

$$|B_t|^2 = |B_x|^2 + |B_y|^2 + |B_z|^2 \quad (6)$$

$$= \frac{\mu_0^2 I_m^2}{4R^2}\left[\sin^2(\omega t) + \sin^2(\omega_2 t)\sin^2\left(\omega t + \frac{\pi}{2}\right) + \sin^2\left(\omega_2 t + \frac{\pi}{2}\right)\sin^2\left(\omega t + \frac{\pi}{2}\right)\right]$$

$$= \frac{\mu_0^2 I_m^2}{4R^2}.$$

As such, the field trajectory will be on the surface of a sphere. Thus, with a structure of three symmetric coils and modulated excitation current, omnidirectional field can be induced at the center and magnetic field will rotate in a three-dimensional manner over time.

Other than at the center point O, the magnetic field induced by each coil is not the same and the magnetic field trajectory is not on the surface of a sphere. For example, as for point A in FIG. 2A, which is away from the center, the magnetic field induced by coil X and coil Y is very small and can be neglected compared with the magnetic field induced by coil Z. Therefore, there is no omnidirectional magnetic field at point A. For similar reasons, there is also no omnidirectional magnetic field at any other point other than the center point O. In practice, even with a spherical or semispherical container, devices will fall to the bottom and/or lay on side surfaces of the container, and there is no omnidirectional magnetic field in those areas with the coil structure shown in FIG. 2A.

According to aspects of the embodiments, an omnidirectional wireless power transfer system includes high frequency power generator configured to generate a supply of high frequency oscillating power, a number of transmitter-side resonant tank circuits electrically coupled to the high frequency power generator, a receptacle including a number of coils arranged for omnidirectional power transfer to an electronic device placed in the receptacle, and a controller configured to activate individual ones of the transmitter-side resonant tank circuits to wirelessly transmit power to the electronic device through near-field resonant inductive coupling. In one example, the receptacle can be embodied as a bowl, and the controller can activate individual ones of the transmitter-side resonant tank circuits over time to generate an omnidirectional magnetic field distribution for wireless power transmission. In other aspects, various transmitter-side and receiver-side tank circuits for coupling independent resonance and zero voltage switching (ZVS) operation are described.

Figure 3:
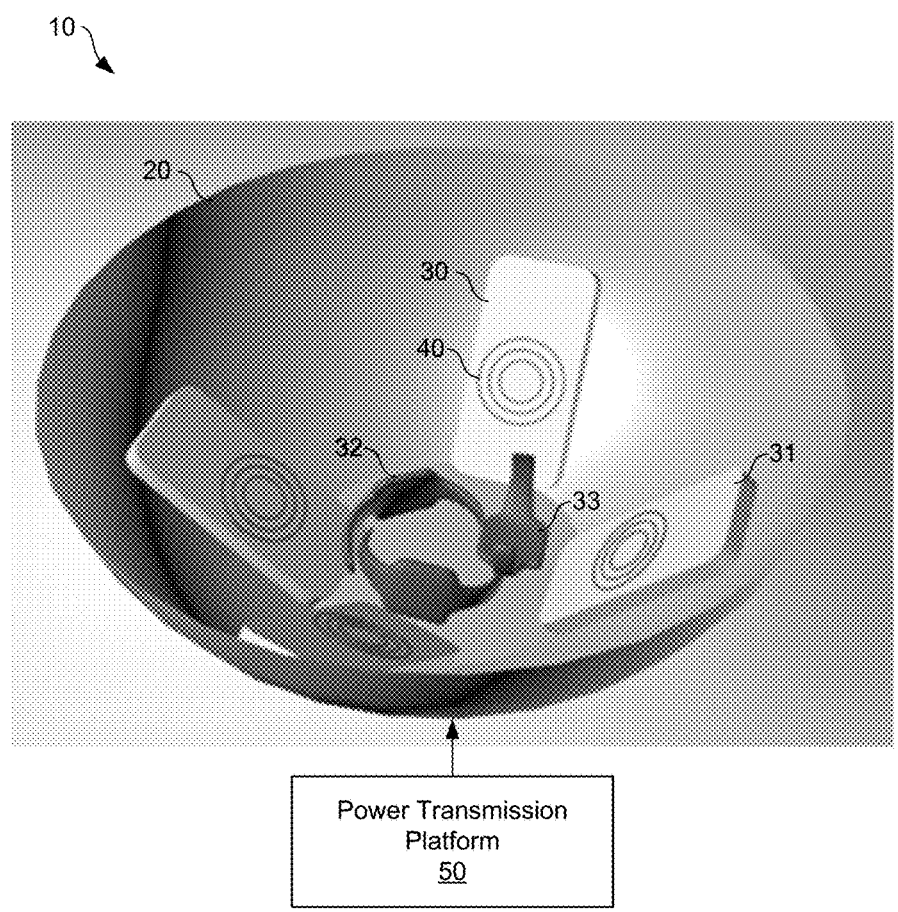
FIG. 3 illustrates an example omnidirectional wireless power transfer system according to various aspects of the embodiments described herein.

In the context of omnidirectional wireless power transfer according to the embodiments, FIG. 3 illustrates an example omnidirectional wireless power transfer system 10. The system 10 includes a receptacle 20 for wirelessly transmitting power to a number of electronic devices 30-33 placed in the receptacle 20. The system 10 also includes a power transmission platform 50 configured to convert energy into radiant frequency power for wireless power transfer to the electronic devices 30-33 placed in the receptacle 20.

The receptacle 20 can be formed in various shapes and sizes. Thus, the receptacle 20 is representative of one shape and size of a receptacle to hold devices for wireless power transfer but is not intended to be limiting as to other types which can be used. In that context, although the receptacle 20 is shown as a bowl in FIG. 3, receptacles of other shapes can be used. For example, the receptacle 20 can be formed as an open or closed spherical or semi-spherical, oval, ovoid, or semi-ovoid (having one or more axes of symmetry), conic or semi-ovoid, pyramid or semi-pyramid, square, rectangular, or other shape of receptacle. Further, the receptacle 20 can be any formed in suitable size. The receptacle 20 can be formed from any suitable material, such as wood, plastic, glass, ceramic, or other material or combination of materials. With regard to the type of material(s) used for the receptacle 20, preference may be to use materials which do not interfere (or do not substantially interfere) with time-varying electric, magnetic, or electromagnetic fields, although such materials (e.g., metal materials, etc.) can be used to form the receptacle 20 (or portions of the receptacle 20) in certain cases.

Although not explicitly shown in FIG. 3, the receptacle 20 includes a number of coils for the transfer of power from the receptacle 20 to the electronic devices 30-33 through inductive coupling. As described in further detail below with reference to FIGS. 4A-4C, the coils can be embedded or integrated in or on the receptacle 20 in a number of different arrangements. Similarly, the electronic devices 30-33 include coils for the transfer of power from the receptacle 20 to the electronic devices 30-33 through inductive coupling. For example, FIG. 3 illustrates an example coil 40 of the electronic device 30, and the other electronic devices 31-33 include similar coils for the transfer of power from the receptacle 20 to the electronic devices 30-33. Using the coils in the receptacle 20 and in the electronic devices 30-33, power can be transferred from the receptacle 20 to the electronic devices 30-33 through near-field resonant inductive coupling, electrodynamic induction, or inductive power transfer between magnetically coupled coils that are part of resonant circuits tuned to resonate at a common frequency.

The electronic devices 30-33 can include various types of devices, such as cellular phones, watches, gaming devices, fitness trackers, RFID-enabled keys and tags, wireless headphones, tablet computers, e-book readers, and other devices. In any case, the electronic devices 30-33 may include a number of relatively larger and smaller devices. As shown in FIG. 3, the electronic devices 30 and 31 (e.g., cellular phones) include two larger front and back surfaces and a number of relatively smaller (i.e., narrower) side surfaces. Thus, when placed in the receptacle 20, the electronic devices 30 and 31 are more likely to rest on one of their larger front or back surfaces along a raised side of the receptacle 20. At the same time, the relatively smaller electronic devices 32 and 33 (e.g., watches, keys, tags, etc.) may be more likely to settle on the bottom of the receptacle 20 than relatively larger devices.

The positions of the coils in the receptacle 20 can be known and constant based on its design. However, the positions and orientations of the coils in the electronic devices 30-33 cannot be known with certainty because the electronic devices 30-33 can settle in various ways (i.e., positions and orientations) when they are placed in the receptacle 20. In practice, the number of ways that the relatively smaller electronic devices 32 and 33 are likely to settle in the receptacle 20 (e.g., front, back, right side, left side) could be greater than those that the relatively larger electronic devices 30 and 31 may settle (e.g., front or back) because of the physical characteristics of the electronic devices 30-31 and the shape and size of the receptacle 20. In any case, the orientation of the electronic devices 30-33 and the coils in the electronic devices 30-33 can vary.

As described in further detail below, the power transmission platform 50 is configured to activate a number of resonant cell circuits (which include the coils in the receptacle 20) to provide a platform for omnidirectional wireless power transfer to the electronic devices 30-33. Due to the omnidirectional nature of the wireless power transfer using the system 10, the transfer of power to the electronic devices 30-33 (for charging or other purposes) can be increased as compared to other systems such as those shown in FIGS. 1A, 1B, 2A, and 2B, among others.

Particularly, even though the orientation of the electronic devices 30-33 will vary from time to time when placed in the receptacle 20, the omnidirectional nature of wireless power transfer using the system 10 offers greater power transfer than systems without such omnidirectional characteristics. In the context of the examples described below, the omnidirectional nature of the system 10 is related to the unique arrangement of the coils in the receptacle 20 and the ability for the power transmission platform 50 to activate those coils, individually or in combination with each other with modulation excitation current. The transfer of power during the activation of individual coils and combinations of coils is evaluated by the power transmission platform 50 to select certain coils which offer better transfer of power. Additionally, the power transmission platform 50 can also modulate the supply of radiant frequency power provided to individual resonant cell circuits in the system 10 to transfer highest power to the electronic devices 30-33.

In other aspects, the system 10 can incorporate resonant converter gain characteristics in which one series resonance frequency is positioned or centered between two parallel resonant frequencies. Resonant converter topologies with such gain characteristics can achieve the advantages of coupling independent resonance and ZVS operation, which means this converter can always operate efficiently no matter how the electronic devices is positioned. Example resonant converter topologies exhibiting those gain characteristics are described in further detail below with reference to FIGS. 9-24. These resonant converter topologies are particularly suitable for applications with variable coupling and variable load, such as encountered during wireless power transfer.

Figure 4A:
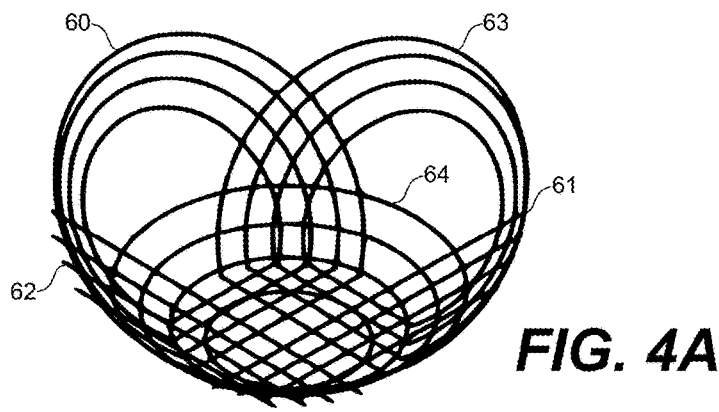
FIGS. 4A-4C illustrate perspective, side, and top-down views, respectively, of an arrangement of coils in the receptacle of the system shown in FIG. 3 according to various aspects of the embodiments described herein.
Figure 4B:
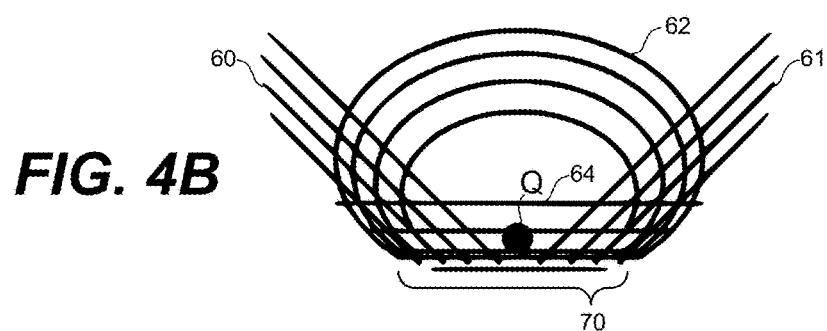
Figure 4C:
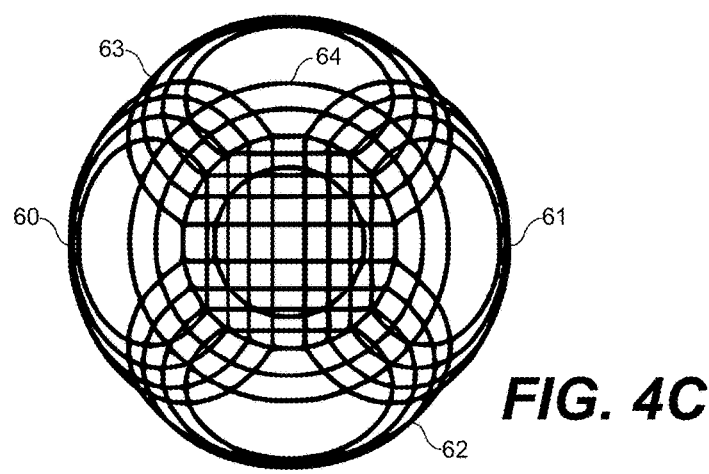

FIGS. 4A-4C illustrate perspective, side, and top-down views, respectively, of an arrangement of coils 60-64 in the receptacle 20 of the system 10 shown in FIG. 3 according to various aspects of the embodiments described herein. Before describing them in further detail, it should be appreciated that the illustration of the coils 60-64 is representative in FIGS. 4A-4B. In various embodiments, the coils 60-64 can be formed as a closed loop of any suitable number of turns of a single conductor or multiple conductors. The profile (e.g., cross-sectional shape) and gauge of the conductors used for the coils 60-64 can also vary among embodiments. One factor that can drive the selection of the type, length, and other electrical characteristics of the conductors used for the coils 60-64 is to create a suitable level of near-field resonant inductive coupling between the coils 60-64 in the receptacle 20 and the coils in the electronic devices 30-33 to achieve resonant circuits for power transfer. The coils 60-64 can be embedded or integrated in or on the receptacle 20 in any suitable way. In other cases, different arrangements of coils can be used in the receptacle 20, including additional or fewer coils or pairs of coils. For example, additional coils or pair of coils can be uniformly (or non-uniformly) offset around the sides of the receptacle 20 as compared to the coils 60-63.

In the arrangement shown in FIGS. 4A-4C, the coils 60 and 61 are arranged in an opposing fashion along a first or "x" axis (although tilted), the coils 62 and 63 are arranged in an opposing fashion along a second or "y" axis (although tilted), and the coil 64 is arranged long a third or "z" axis. Collectively, the coils 60 and 61 are referenced as the coil-x. Similarly, the coils 62 and 63 are collectively referenced as the coil-y, and the coil 64 is referenced as the coil-z. The conductors of the coils 60-64 intersect at the bottom 70 of the receptacle 20 as shown in FIGS. 4A and 4C.

One benefit of the arrangement of the coils 60-64 shown in FIGS. 4A-4C is that it permits the generation of magnetic fields in a number of different directions, particularly in the bottom 70 of the receptacle 20. As described in greater detail below, the power transmission platform 50 can activate a combination of the coils 60-64 in various ways to generate a composite direction and magnitude of magnetic field using the coils 60-64. The direction and magnitude of the magnetic field will depend, at least in part, upon which of the coils 60-64 is excited, and the magnitude and phase of the exciting current provided to the coils 60-64 respectively, as determined by the power transmission platform 50. Thus, the power transmission platform 50 can activate or excite a number of the coils 60-64—and at a particular, potentially modulated, magnitude and/or phase—depending upon where electronic devices, such as the electronic devices 30-33, settle into the receptacle 20. The generation of magnetic field at a particular, adjustable direction and magnitude is advantageous because the orientation of the coils in the electronic devices 30-33 can vary depending upon how the electronic devices 30-33 settle into the receptacle 20 as described above.

Figure 5:
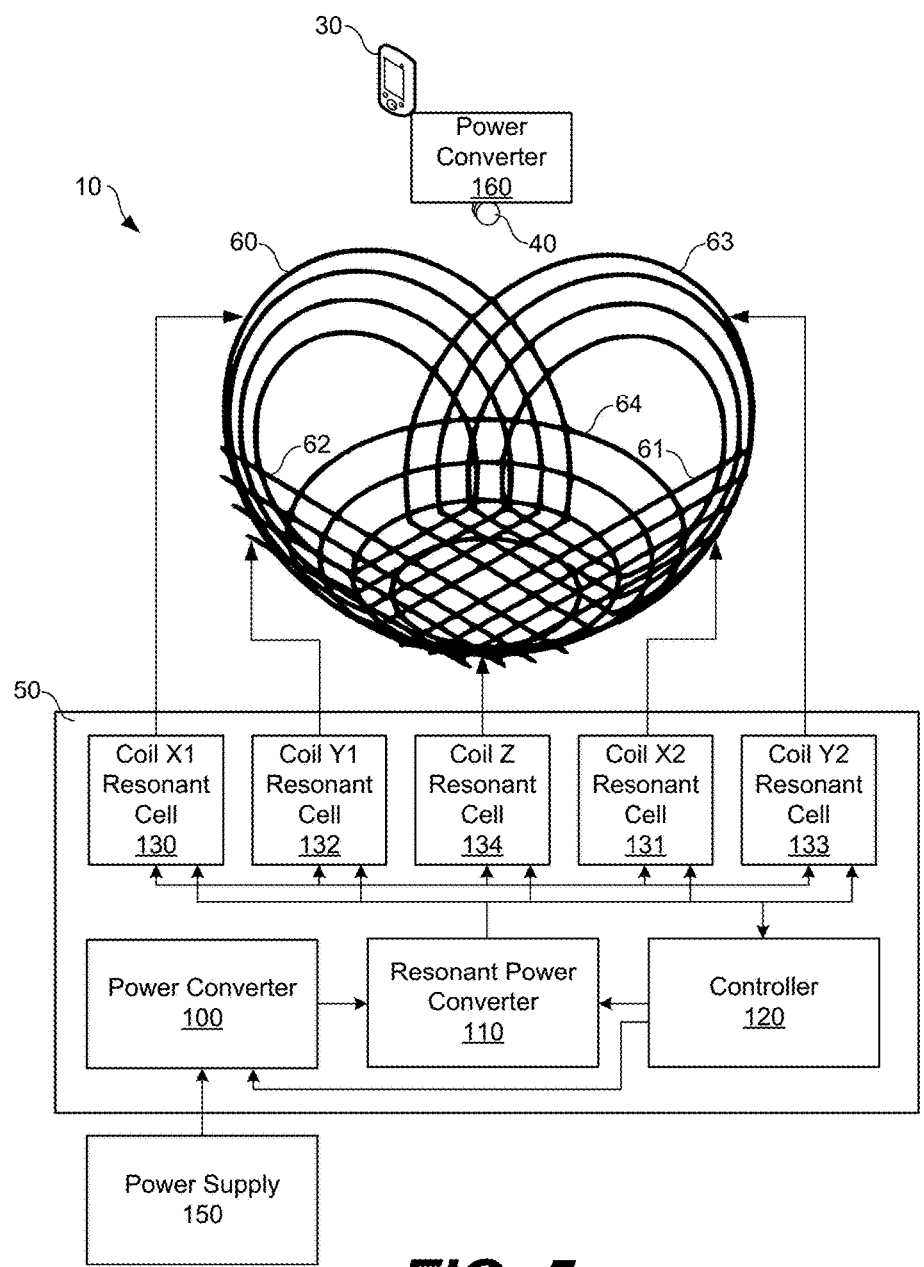
FIG. 5 illustrates other components of the example omnidirectional wireless power transfer system shown in FIG. 3 according to various aspects of the embodiments described herein.

FIG. 5 illustrates other components of the example omnidirectional wireless power transfer system 10 shown in FIG. 3. Among other components, the power transmission platform 50 includes the power converter 100, resonant power converter 110, controller 120, and resonant cells 130-134. FIG. 5 also illustrates a power supply 150 for the power transmission platform 50. As described herein, the power transmission platform 50 can transfer power to the electronic device 30, which includes the coil 40 and a power converter 160. The resonant cells 130-134 are electrically coupled in a closed circuit with the coils 60-64, respectively, and the coils 60-64 can be considered circuit elements in the resonant cells 130-134.

The power supply 150 can be embodied as any suitable supply of power for the power transmission platform 50. In that context, the supply of power can be provided from line or bulk power, one or more batteries or other charge stores, or other power supplies. In various cases, the supply of power can be provided in the form of alternating or direct current at suitable level of potential.

The power converter 100 is configured to convert the power provided by the power supply 150 to power suitable for the resonant power converter 110. In that context, the power converter 100 can be embodied as any suitable topology of power converter, such as a switch mode converter including a buck or boost arrangement of switching power transistors, for example. In one case, the power converter 100 can be embodied as a buck converter to step down power provided by the power supply 150 at a first, higher DC voltage to power for the resonant power converter 110 at a second, lower DC voltage. In some cases, the controller 120 can provide one or more modulated control signals to the power converter 100 to control the duty cycle of its switching power devices and, thus, the supply of power to the resonant power converter 110, although the power converter 100 can operate in other cases without any external control. In some cases, the function of power converter 100 can also be achieved by controlling the duty cycle of the resonant power converter 110, and the power converter 100 can be eliminated.

As discussed in further detail below with reference to FIG. 10, the resonant power converter 110 forms, in part, a number of resonant circuits along with the resonant cells 130-134, the coils 60-64, the coil 40, and the power converter 160. The resonant power converter 110 can include a number of switching transistors in one or more switch banks. In that context, the resonant power converter 110 is configured to feed charge from the power converter 100 to a transmitter-side resonant tank in each of the resonant cells 130-134. Various examples of transmitter-side resonant tank circuits that can be used for the resonant cells 130-134 are described below with reference to FIGS. 9, 10, 11, 15, and 20-24. From the resonant cells 130-134, power is inductively coupled through one or more of the coils 60-64, to the coil 40, and to a receiver-side resonant tank in the power converter 160. Examples of receiver-side resonant tank circuits for the power converter 160 are also described below with reference to FIGS. 9, 10, 11, 15, and 20-24. According to one aspect of the embodiments, the transmitter-side and receiver-side resonant tank circuits can be designed for coupling independent resonance with ZVS operation.

As noted above, the resonant power converter 110 includes circuitry to supply RF power (e.g., high frequency sinusoidal alternating current) to drive the resonant tank circuits in the resonant cells 130-134. In one case, the resonant power converter 110 includes a switch bank of one or more switching transistors for each of the resonant cells 130-134, and the resonant power converter 110 can supply RF power separately to each of the resonant cells 130-134. In that case, the resonant power converter 110 is representative of a number of different resonant power converters for each of the resonant cells 130-134, and modulated RF power can be provided respectively to each of the resonant cells 130-134. The RF power can be respectively modulated in amplitude and/or phase through transistor switching control, modulation circuitry, or other circuitry directed by one or more control signals provided from the controller 120.

In another case, the resonant power converter 110 includes a switch bank for one or more pairs of the resonant cells 130-134, such as fort the X, Y, and Z coils. In that case, modulated RF power can be provided to the X1 and X2 resonant cells 130 and 131, to the Y1 and Y2 resonant cells 132 and 133, and to the Z resonant cell 134. The RF power can be modulated respectively in amplitude and/or phase for the X, Y, and Z coils through transistor switching control, modulation circuitry, or other circuitry directed by one or more control signals provided from the controller 120.

In other cases, the resonant power converter 110 can generate RF power for the resonant cells 130-134, collectively, and include a one or more amplitude and/or phase modulation circuits to generate a number of amplitude and/or phase modulated versions of the RF power for the resonant cells 130-134. In any case, the resonant power converter 110 includes circuitry to supply power that drives the resonant tank circuits in the resonant cells 130-134 for near-field resonant inductive coupling of power to the coil 40 of the electronic device 30, among coils of other devices.

The controller 120 can be embodied as one or more processors and related circuitry to support the processors, such as one or more memory devices, crystal oscillators, linear regulators, analog-to-digital converters, digital-toanalog converters, local interfaces, etc. The local interface can include, for example, a data bus with an accompanying address/control bus between memory devices and processors. The processor can include a general- or specific-purpose processor, such as a microprocessor, microcontroller, digital signal processor, or other processing circuitry. The controller 120 can also be embodied, at least in part, as one or more discrete logic circuits, application specific integrated circuits (ASICs), programmable logic devices (e.g., field-programmable gate array (FPGAs), and complex programmable logic devices (CPLDs)).

In some cases, one or more processors of the controller 120 can execute computer-readable software or program instructions embodied in a non-transitory computer-readable medium (e.g., memory device). Through execution of the instructions, the controller 120 can be directed to perform one or more of the operations described herein. In other cases, the controller 120 can be designed to conduct or perform the operations described herein without the execution of software.

The controller 120 is configured to control the overall operation of the power transmission platform 50 and the transmission of power to devices. For example, the controller 120 is configured to control the resonant power converter 110 to activate (e.g., provide RF power to) one or more of the resonant cells 130-134. In that way, the controller 120 can direct and control the wireless transmission of power to the electronic device 30. For example, the controller 120 can generate one or more control signals to direct the resonant power converter 110 to generate RF power to induce resonant, inductive power transfer between magnetic-field-coupled coils in the resonant cell 130 and the coil 40 of the electronic device 30. Similarly, the controller 120 can direct the resonant power converter 110 to induce power transfer between magnetic-field-coupled coils in any combination of one or more of the resonant cells 130-134 and the coil 40 of the electronic device 30.

Further, the controller 120 can direct the resonant power converter 110 to generate RF power at a certain frequency, amplitude, and/or phase for the resonant cell 130 and the other resonant cells 131-134, respectively. Thus, the controller 120 can control whether RF power is provided, as well as the frequency, amplitude, and phase of that RF power, to each of the resonant cells 130-134 individually. The manner in which the resonant cells 130-134 can be excited in the power transmission platform 50 is thus very flexible, as various combinations of the coils 60-64 can be selectively excited in various ways through the resonant cells 130-134 to induce a preferred magnitude and direction of the magnetic field in or around the receptacle 20. In effect, the magnitude and direction of the magnetic field can be adjusted to account for different positions and orientations the coil 40 of the electronic device 30 and similar coils of other electronic devices in the receptacle 20.

For example, if the electronic device 30 is placed in and rests along a side face of the receptacle 20 near the coil 60, then the controller 120 can direct the resonant power converter 110 to generate RF power for the resonant cell 130 and the coil 60. Because of the position and orientation of the electronic device 30 in proximity to the coil 60, the excitation of the coil 60 is likely to lead to a relatively high power transfer through resonant inductive coupling, at least as compared to an excitation of the other coils 61-64.

When the electronic device 30 is first placed into the receptacle 20, however, the power transmission platform 50 may not know the position and orientation at which the electronic device 30 was placed or settled. Thus, the controller 120 is configured to sense a level of power transferred (or that can be transferred) to the electronic device 30 by exciting each of the resonant cells 130-134 (and, hence, the coils 60-64) individually over time. For example, the controller 120 can direct the resonant power converter 110 to provide RF power to each of the resonant cells 130-134, individually, and to measure the amount of power transferred to the electronic device 30 by each one. The power transfer can be measured or sensed using any suitable techniques, such as through the identification of voltage drops or droops, the amount of current supplied, or other approaches. In that way, the controller 120 can identify a coefficient of power transfer or resonant inductive coupling between individual ones of the resonant cells 130-134 (and the coils 60-64) and the coil 40 of the electronic device 30, respectively.

The controller 120 can also sense a level of power transferred to the electronic device 30 by the excitation of one or more combinations of the resonant cells 130-134 over time. In that case, the controller 120 can direct the resonant power converter 110 to provide RF power to various combinations of the resonant cells 130-134 over time and measure the amount of power transferred for each combination. Additionally, the RF power provided to respective ones of the resonant cells 130-134 can be modulated in amplitude and/or phase as compared to each other, and the controller 120 can measure the amount of power transferred for various combinations of that modulated power.

For the bottom 70 (FIG. 4B) of the receptacle 20, combinations of the coils 60-64 can be excited simultaneously to induce rotating and, as averaged over time, omnidirectional magnetic field. For example, the coils 60 and 64 can be simultaneously excited by RF power offset in phase with respect to each other by 90 degrees. In that case, rotating magnetic field can be induced in the x/z plane over about half of the bottom 70. In a similar way, rotating magnetic field in the x/y plane can be induced by simultaneously exciting the coils 60 and 62, and still other combinations of the coils 60-64 can be excited. Thus, rotating magnetic field in different planes can be induced in the bottom 70 through the excitation of different combinations of the coils 60-64. Also, by exciting one or more of the coils 60-64, respectively, for different periods of time, using different amplitudes, and/or different phases of high frequency sinusoidal alternating current, omnidirectional magnetic field can be induced in the bottom 70 in an average sense.

Figure 6:
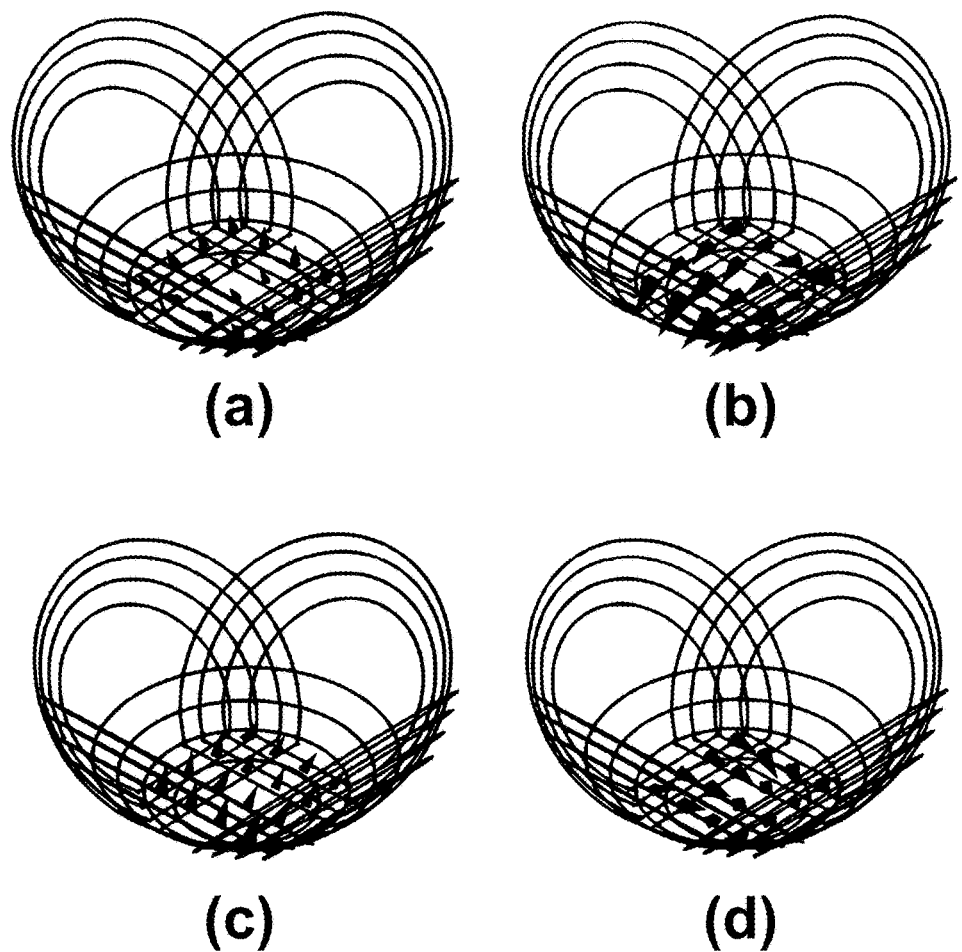
FIG. 6 illustrates example magnetic field distributions provided by the receptacle of the system shown in FIG. 3 at different time instants according to various aspects of the embodiments described herein.

Additionally, the coils 60-64 can be excited simultaneously to induce a three-dimensional rotating magnetic field in the bottom 70 of the receptacle 20. One example of the excitation currents provided to the coils 60-64 is similar to that shown in FIG. 2B. For that example case, the magnetic field distribution provided in the bottom 70 of the receptacle 20 at different time instants was simulated with finite element analysis (FEA) software, and the results are shown in FIG. 6. In FIG. 6, panes (a)-(d) correspond to magnetic field distributions at different time instants. As shown by the directional arrowheads in the bottom 70 of the receptacle 20, the magnetic field distribution shifts over time between upward, downward, right, and left directions.

Thus, the controller 120 can achieve an omnidirectional magnetic field in the bottom 70 of the receptacle 20 through controlled excitation of the resonant cells 130-134 and the coils 60-64. The excitation examples described herein are not exhaustive, however, and other ways are within the scope of the embodiments. With so many flexible ways of excitation, the proposed arrangement of the coils 60-64 in the receptacle 20 can achieve omnidirectional wireless power transfer.

In one experiment using a prototype receptacle similar to the receptacle 20, resonant power converters were used to drive coils arranged similar to the coils 60-64 with high frequency (i.e., 6.78 MHz) sinusoidal alternating current. In the experiment, perpendicular magnetic field at a side face of a receptacle similar to the receptacle 20 and omnidirectional magnetic field in the bottom of the similar receptacle were induced. As part of the experiment, successful charging of a cellular telephone was demonstrated using a fabricated receiver coil to capture the energy transferred via the magnetic field.

Figure 7:
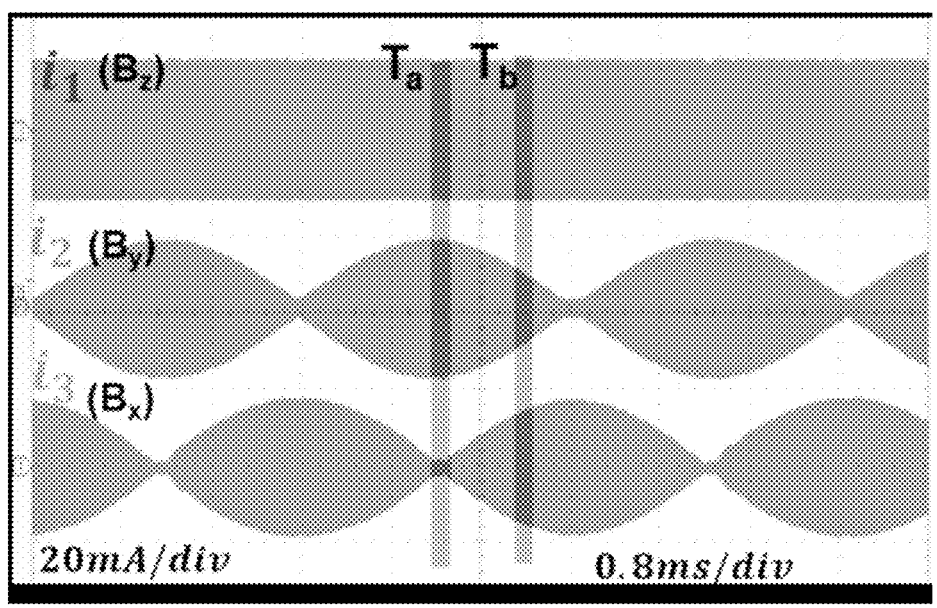
FIG. 7 illustrates excitation currents used during an experiment according to various aspects of the embodiments described herein.

In another experiment using a near-field probe and the prototype receptacle, the excitation currents shown in FIG. 7 were used to excite the arrangement of coils similar to the coils 60-64. In the experiment, the tip of a near-field probe was positioned with respect to the prototype receptacle at a position similar to the point "Q" shown in FIG. 4B, and the probe was used to measure the magnetic field over time.

Figure 8:
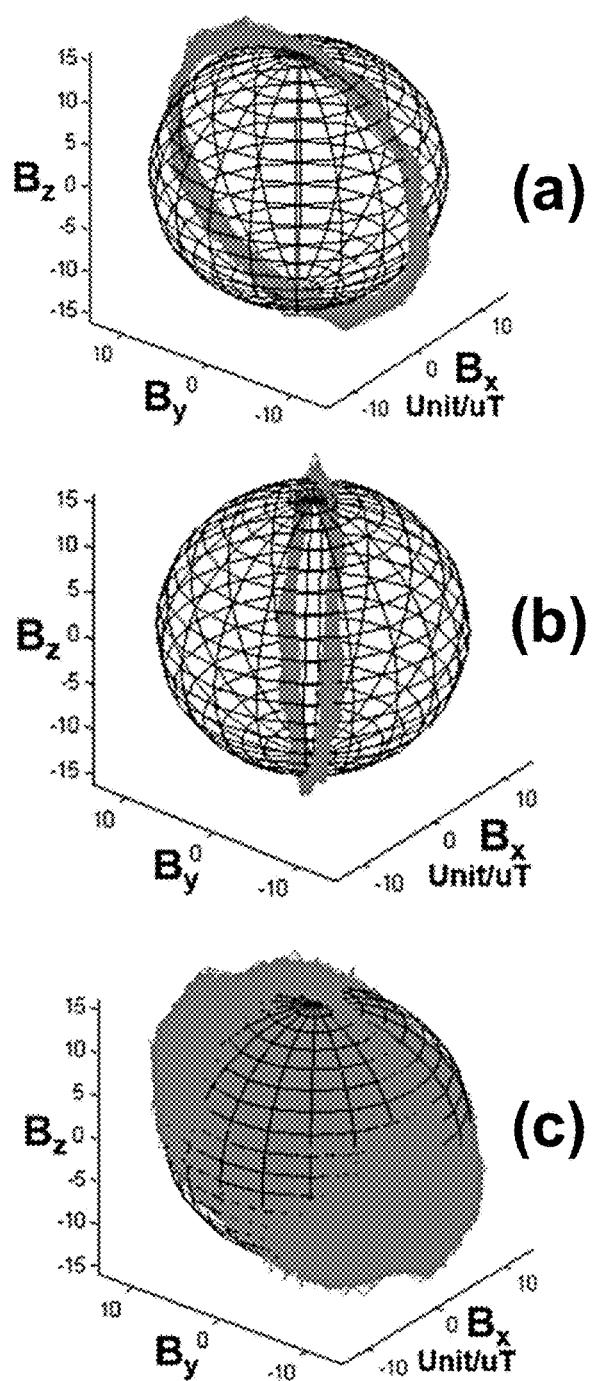
FIG. 8 illustrates measured magnetic field trajectory in an experiment according to various aspects of the embodiments described herein.

To visualize the direction of the magnetic field generated using the prototype, the trajectory of the magnetic field is plotted in FIG. 8 based on the measured data. The ring shape magnetic field trajectory shown in pane (a) in FIG. 8 corresponds to the time period $T_a$ in FIG. 7, and the ring shape magnetic field trajectory shown in pane (b) in FIG. 8 corresponds to the time period $T_b$ in FIG. 7. Over the full excitation cycle shown in FIG. 7, the ring shaped magnetic field trajectories cover the whole surface of a sphere, as shown in pane (c) in FIG. 8. Thus, omnidirectional magnetic field distribution at a position on the prototype similar to the point "Q" was demonstrated. Similarly, magnetic field trajectories at other points over the bottom of the prototype are also on the surface of a sphere as shown in FIG. 8. Therefore, omnidirectional magnetic field distribution can be induced with the proposed wireless charging system.

Turing to other aspects of the embodiments, one challenge in the design of resonant converters is to design for ZVS operation of the switching devices. A recommended switching frequency of one wireless power transfer standard is 6.78 MHz. The use of such high switching frequencies can be detrimental to switching devices unless resonant converters are designed for ZVS operation. Without ZVS operation, switching losses can be relatively high and efficiency suffers. Additionally, electromagnetic compatibility of the system can also be a concern for designs that fail to account for ZVS operation.

Figure 9:
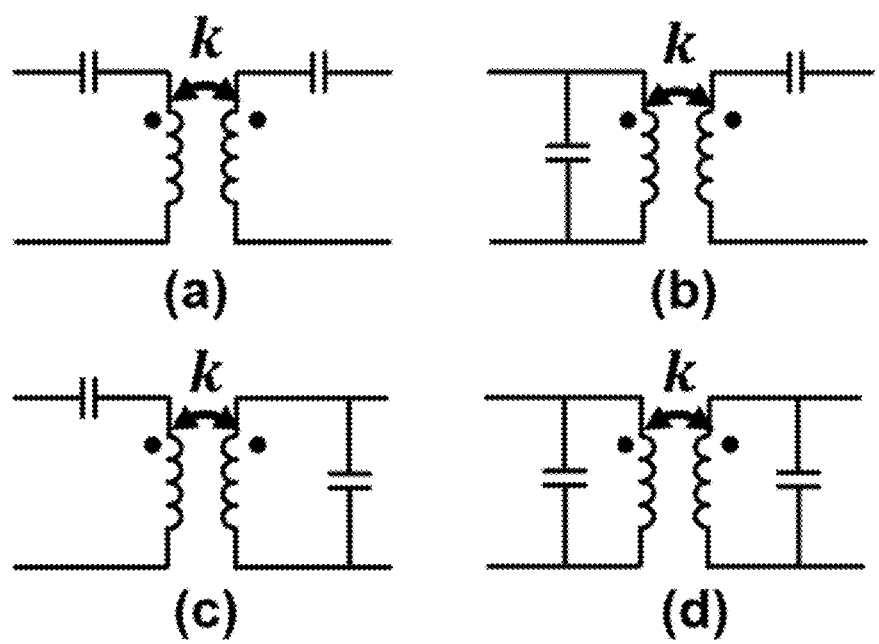
FIG. 9 illustrates four example resonant tank topologies according to various aspects of the embodiments described herein.

FIG. 9 illustrates four example resonant tank topologies according to various aspects of the embodiments described herein. Particularly, FIG. 9 illustrates a series-series resonant tank at pane (2), a parallel-series resonant tank at pane (b), a series-parallel resonant tank at pane (c), and a parallel-parallel resonant tank at pane (d). Among the four resonant tank topologies shown in FIG. 9, the series-series resonant converter is widely used.

In the example resonant tank topologies shown in FIG. 9, k is a coupling metric related to the level of inductive coupling between the transmitter coil and the receiver coil. In practice, the value of k may be based on the position and orientation of the receiver coils in the receiver-side resonant tanks as compared to the transmitter coils of the transmitter-side resonant tanks. In other words, as discussed above, in a wireless power transfer system where a user is expected to set or place an electronic device including a receiver coil into a charging receptacle, the position and orientation of the receiver coil (with respect to the transmitter coil) is dependent on the user's placement of the device and will vary. Thus, the value of k can vary dependent on the user's placement of the device into the charging receptacle.

Figure 10:
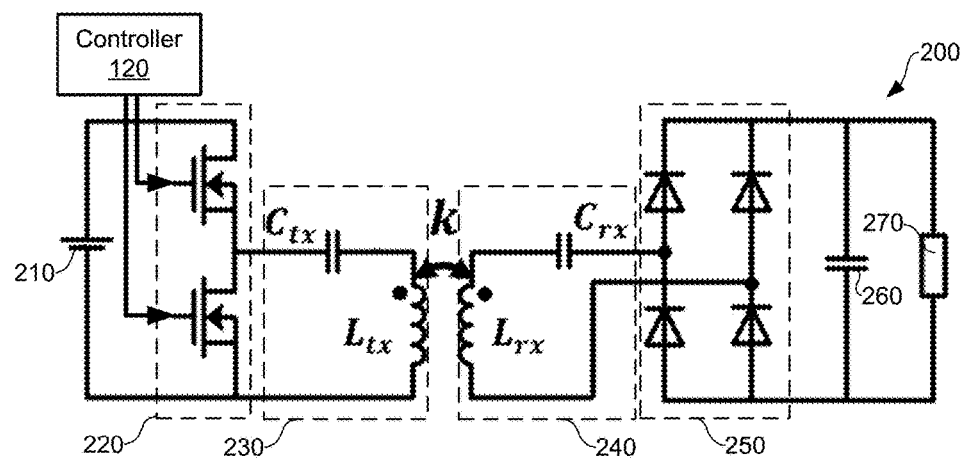
FIG. 10 illustrates an example series-series resonant converter topology according to various aspects of the embodiments described herein.

FIG. 10 illustrates an example resonant converter 200 incorporating series-series resonant tank topology according to various aspects of the embodiments described herein. At the transmitter side of the resonant converter 200, a power source 210 supplies charge to a switch bank 220, which is configured to feed charge to a transmitter-side resonant tank 230. The resonant converter 200 also includes a receiver-side resonant tank 240, a rectifier bank 250, a bulk charge store 260, and a load 270. The resonant converter 200 is representative and provided for context to describe certain features and advantages of the embodiments. Other circuit elements (and variations of the circuit elements shown) can be relied upon in various embodiments.

In FIG. 10, the power source 210 is representative of any suitable supply of power for the resonant converter 200. The switch bank 220 includes an arrangement of switching transistors. Although designs using a single transistor are possible, half bridge and full bridge arrangements of transistors can be used to drive the transmitter-side resonant tank 230 more efficiently, and a half bridge is shown for the switch bank 220 in FIG. 10. The transmitter-side resonant tank 230 and the receiver-side resonant tank 240 include combinations of capacitive and inductive circuit elements that form a series-series resonant tank topology. The transmitter-side resonant tank 230 in FIG. 10 includes a resonant capacitor $C_{tx}$ and transmitter coil $L_{tx}$, and the receiver-side resonant tank 240 includes the resonant capacitor $C_{rx}$ and receiver coil $L_{rx}$. The resonant capacitor $C_{tx}$, transmitter coil $L_{tx}$, resonant capacitor $C_{rx}$, and receiver coil $L_{rx}$ can be selected for use with a resonant operating frequency for near-field resonant inductive coupling.

Other combinations of capacitive and inductive circuit elements for other converter topologies, including any of those shown in FIGS. 9, 10, 11, 15, and 20-24, can be used. The rectifier bank 250 includes an arrangement of diodes to rectify the flow of power which is inductively coupled from the transmitter-side resonant tank 230 to the receiver-side resonant tank 240 for storage into the bulk charge store 260. Any suitable arrangement of diodes (e.g., half bridge, full bridge, etc.) can be used in the rectifier bank 250.

Here, it is noted that the power source 210 is representative of a supply of power, such as the supply of power provided by the power converter 100 shown in FIG. 5. Further, the resonant power converter 110 shown in FIG. 5 can include a switch bank similar to the switch bank 220 for each of the resonant cells 130-133, and the switching transistors can be controlled by control signals provided by the controller 120. Each of the resonant cells 130-133 shown in FIG. 5 can include a transmitter-side resonant tank similar to the transmitter-side resonant tank 230. Similarly, each of the coils 60-64 shown in FIG. 5 can include a transmitter coil similar to the transmitter coil $L_{tx}$. The power converter 160 for the electronic device 30 shown in FIG. 5 can include a receiver-side resonant tank similar to the receiver-side resonant tank 240, and the coil 40 of the electronic device 30 can include a receiver coil similar to the receiver coil $L_{rx}$.

Figure 11:
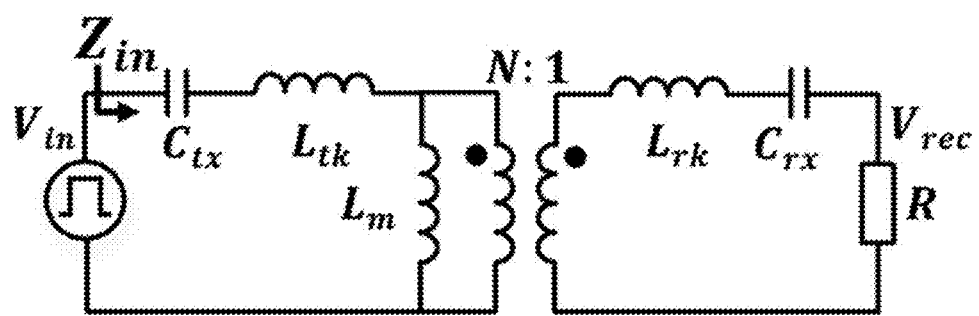
FIG. 11 illustrates an example equivalent circuit of the example series-series resonant converter shown in FIG. 10 according to various aspects of the embodiments described herein.

FIG. 11 illustrates an example AC equivalent circuit of the series-series resonant converter shown in FIG. 10 with a T model of the transformer. Based on the equivalent circuit, voltage gain and phase of input impedance curves are shown for different load resistances and resonant couplings in FIGS. 12 and 13. The k=0.4 case of coupling is shown in FIG. 12, and the k=0.2 case of coupling is shown in FIG. 13.

Figure 12:
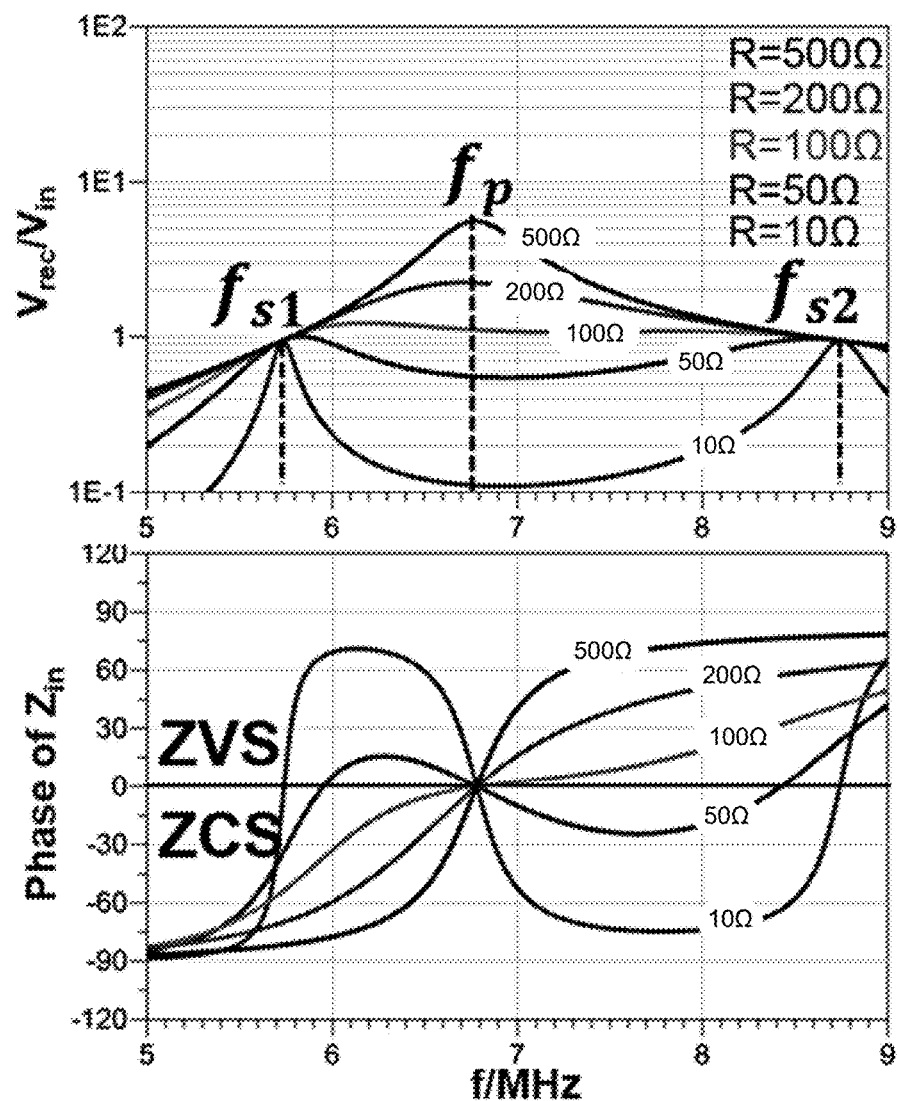
FIGS. 12 and 13 illustrate voltage gain and phase of input impedance curves for different load resistances and resonant couplings according to various aspects of the embodiments described herein.
Figure 13:
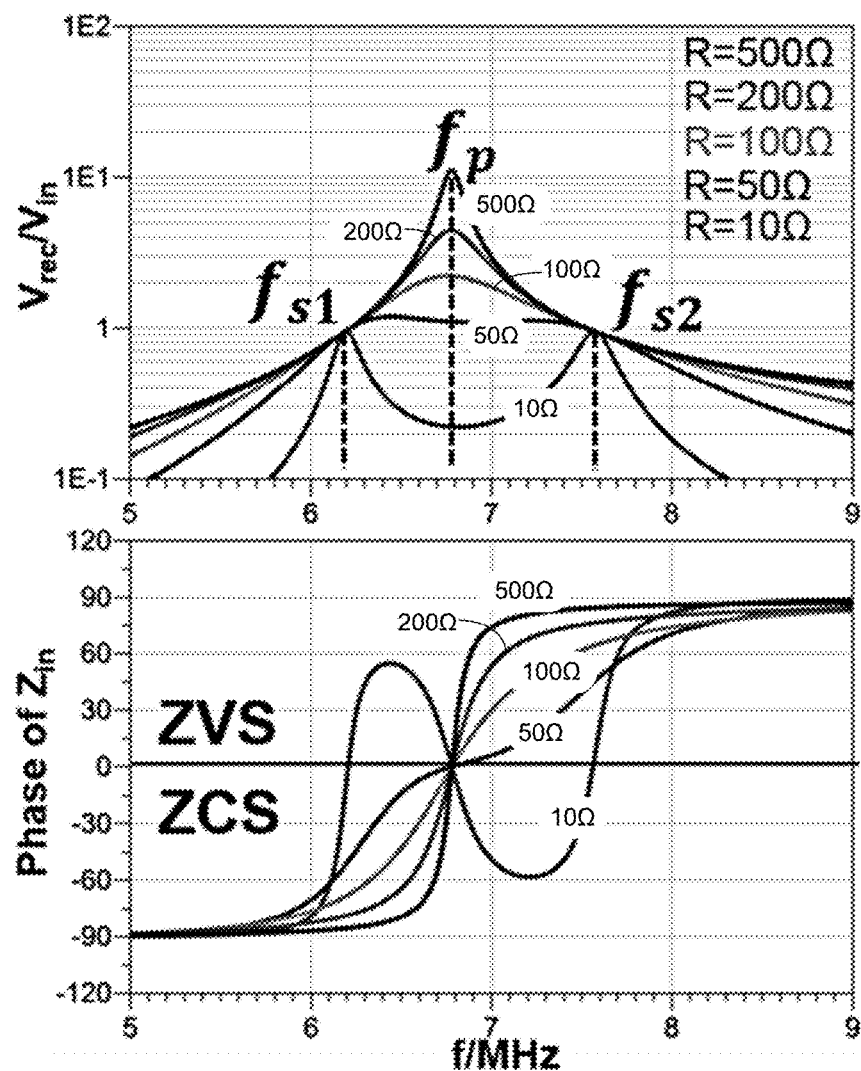

According to the voltage gain curves in FIGS. 12 and 13, there are three resonant frequencies in the series-series resonant converter topology, including two series resonant frequencies $f_{s1}$, $f_{s2}$ and one parallel resonant frequency $f_p$. The expressions for these three resonant frequency are:

$$f_{s1} = \frac{1}{2\pi\sqrt{(1+k)L_{tx}C_{tx}}}, \quad (7)$$

$$f_{s2} = \frac{1}{2\pi\sqrt{(1-k)L_{tx}C_{tx}}}, \text{ and} \quad (8)$$

$$f_p = \frac{1}{2\pi\sqrt{L_{tx}C_{tx}}}. \quad (9)$$

According to the expressions, the two series resonant frequencies (SRFs) are coupling dependent and the parallel resonant frequency (PRF) is coupling independent. Therefore, the SRFs move and the PRF is fixed when the resonant coupling of the series-series resonant converter changes as shown in FIGS. 12 and 13. Further, for different load conditions, the voltage gain can change dramatically for the PRF. This variable voltage gain can be a challenge for system controllability in voltage output applications. For example, as discussed above, the load presented by electronic devices can vary as the load presented by a battery varies based on the different charging stages in the charging profile of the battery. However, the SRFs exhibit load-independent voltage gain, which is desirable from controllability point of view.

Compatible inductive input impedance is important for ZVS operation of switching devices in half bridges and related switching topologies. The phase of input impedance with different loads is also shown in FIGS. 12 and 13. As shown, the input impedance is resistive at the PRF, which is at the boundary between the ZVS and zero current switching (ZCS) regions. Therefore, ZVS operation can be lost around the PRF due to component tolerances. For the first SRF at $f_{s1}$, the input impedance is capacitive in most load ranges. Thus, ZVS operation is not available. On the contrary, ZVS operation can be achieved in most load SRF ranges at $f_{s2}$.

In summary, the resonant frequency characteristics of series-series resonant converters is that, for SRF $f_{s1}$: moving SRF with variable coupling, and no ZVS operation in most load ranges. For SRF $f_{s2}$: moving SRF with variable coupling, ZVS operation in most load ranges. For PRF $f_p$: variable voltage gain with different loads, ZVS operation cannot be guaranteed.

Thus, there is no good operating region with variable coupling and load in series-series resonant converters. At the same time, parallel-series and parallel-parallel resonant converters are most suitable for current source input applications. In real applications, current source input applications are relatively difficult to implement, and those two topologies are not considered here. The series-parallel resonant converter has one moving SRF with variable coupling, which is similar to the series-series resonant converter. Thus, the four basic resonant topologies shown in FIG. 9 are not ideal to solve the challenges of varying coupling and load conditions in wireless power transfer applications.

Figure 14:
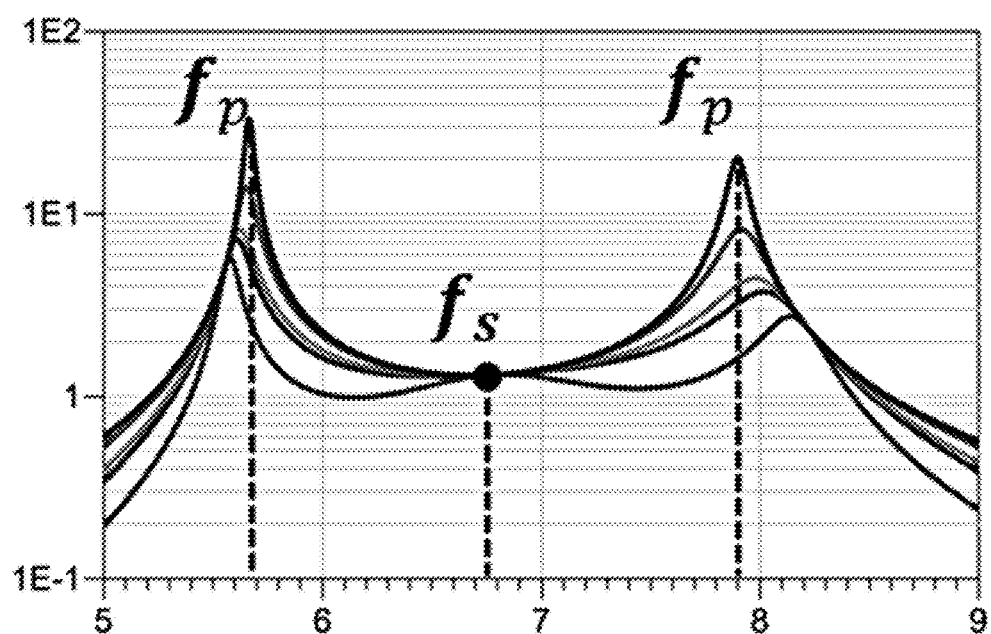
FIG. 14 illustrates gain characteristics of a resonant converter having a series resonant frequency between two parallel resonant frequencies according to various aspects of the embodiments described herein.

As described above, the gain characteristics of series-series resonant converters include two coupling dependent SRFs with load independent voltage gains and one coupling independent PRF with load dependent voltage gains, and the PRF is in the center of the SRFs. Therefore, the center resonance is coupling independent. Similarly, gain characteristics with one SRF in the center of two PRFs can achieve coupling and load independent resonance. One example of gain characteristics with one SRF in the center of two PRFs is shown in FIG. 14. With the type of gain characteristics shown in FIG. 14, coupling and load independent resonance can be achieved for near-field wireless power transfer at the center SRF. At the same time, at the left SRF, ZVS can be achieved due to the negative slope of the gain curve. Therefore, a resonant converter with this type of gain characteristics can be used to achieve coupling and load independent resonance with ZVS operation for near-field wireless power transfer.

Figure 15A:
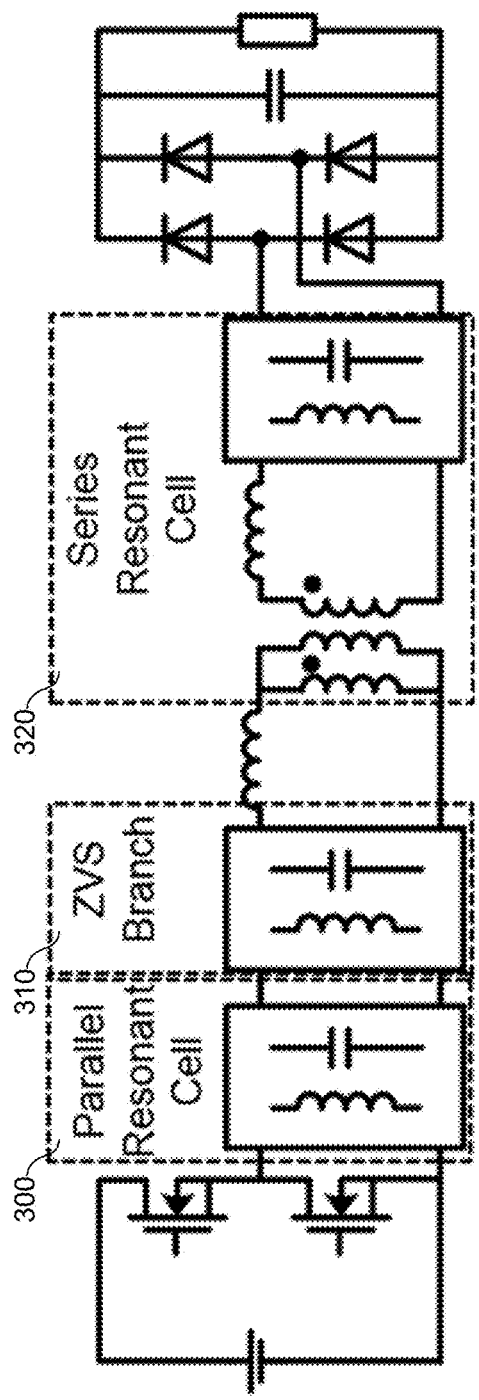
FIGS. 15A-15C illustrate the general topology forms of resonant converters with coupling independent resonance and zero voltage switching according to various aspects of the embodiments described herein.
Figure 15B:
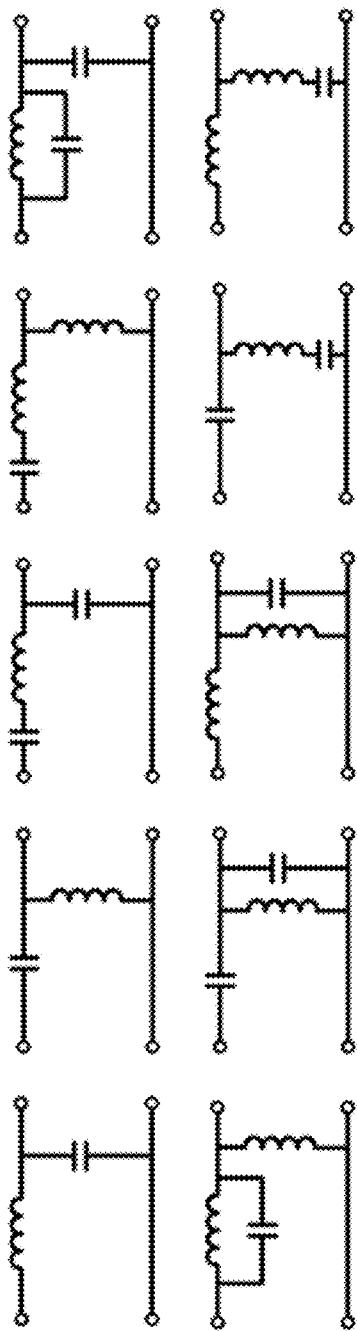
Figure 15C:
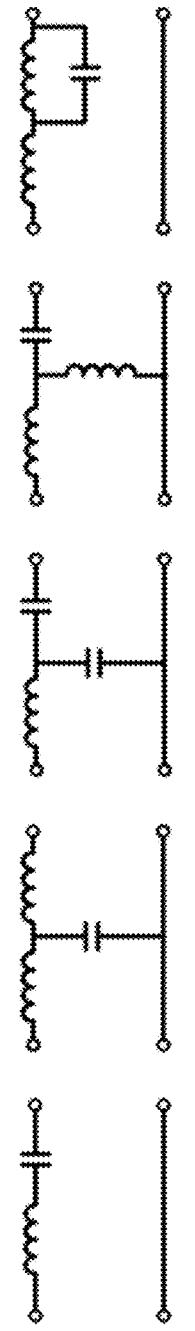

FIG. 15A illustrates the general topology form of a resonant converter with coupling independent resonance and zero voltage switching. The resonant converter shown in FIG. 15 includes a parallel resonant cell 300, a ZVS branch 310, and a series resonant cell 320. The parallel resonant cell 300 can be implemented in many ways. FIG. 15B illustrates example parallel resonant cells 300 implemented with two or three passive components. As shown in FIG. 15, one simple form of the ZVS branch 310 can be a capacitor, which can change the input impedance to inductive to make sure zero voltage switching occurs. However, other, more complicated forms of the ZVS branch 310 with more components can also be used to change the input impedance. The series resonant cell 320 can use the self-inductance of the receiver coil as part of resonant cell. Therefore, there is always an inductor in the left side of series resonant cell. FIG. 15C illustrates example series resonant cells 320 implemented with two or three passive components.

Figure 16:
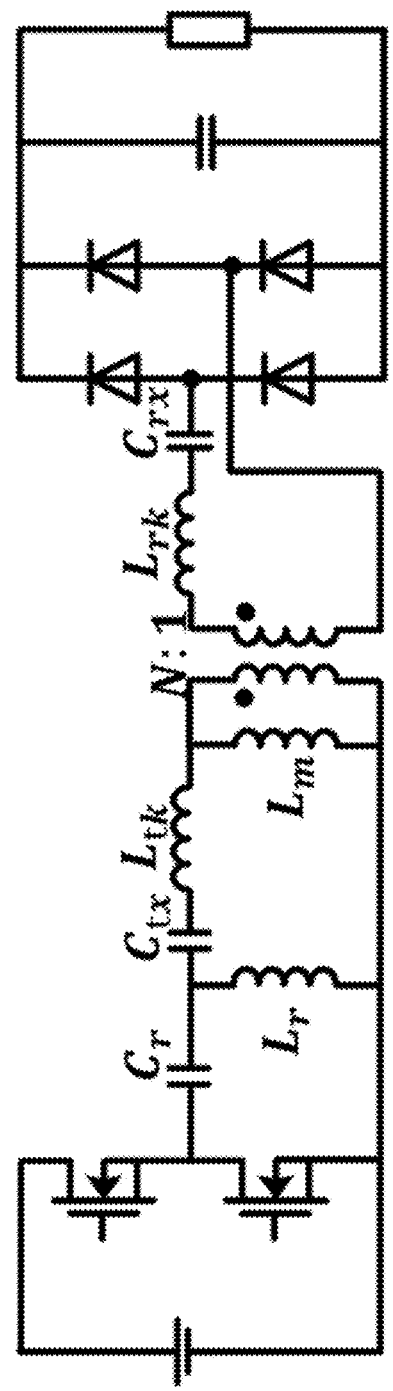
FIG. 16 illustrates a resonant converter having a series resonant frequency between two parallel resonant frequencies according to various aspects of the embodiments described herein.
Figure 17:
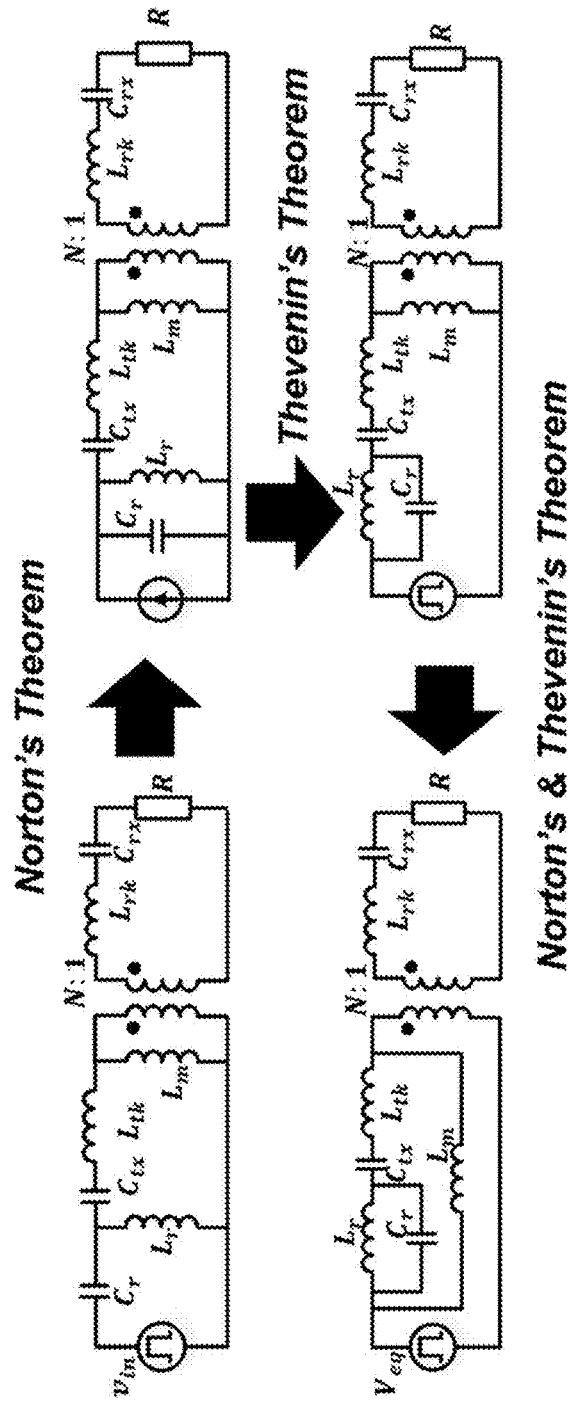
FIG. 17 illustrates an example use of Norton's Theorem and Thevenin's Theorem to transform the resonant tank network shown in FIG. 16 into a simple branch according to various aspects of the embodiments described herein.

One example resonant converter topology, called a CLCL-LC resonant converter, is shown in FIG. 16. To find how the series resonance is formed in the CLCL-LC resonant converter, the use of Norton's Theorem and Thevenin's Theorem is shown in FIG. 17 to transform the relatively complicated resonant tank network into a simple branch in series with a load resistor. Since the input source has no relationship with the resonant frequency of the resonant network, a simple branch with $L_{rk}$ reflected into the primary (transmitter) side, as shown in FIG. 17, has the same SRF as the CLCL-LC resonant converter.

Figure 18:
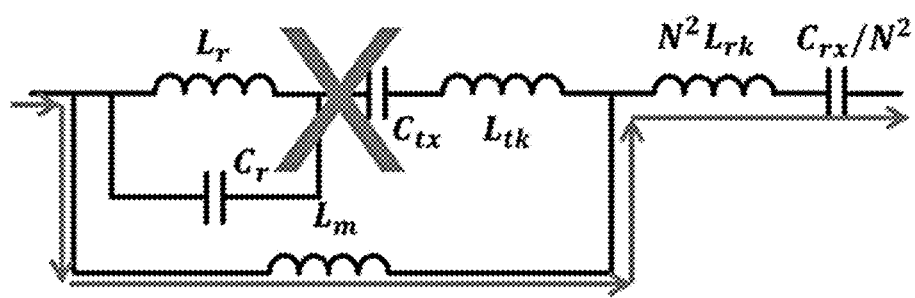
FIG. 18 illustrates the simple branch developed using Norton's Theorem and Thevenin's Theorem from the relatively complicated resonant tank network shown in FIG. 16 according to various aspects of the embodiments described herein.

According to FIG. 18, if $L_r$ and $C_r$ are in resonance, power will go through $L_m$, $L_{rk}$, and $C_{rx}$ due to the high impedance of the parallel resonance. Further, $L_m$ and $L_{rk}$ in series can be equivalent to the self-inductance of the receiver coil, which is coupling independent. If $C_{rx}$ is designed to resonate with $L_{rx}$ at the resonance frequency of $L_r$ and $C_r$, then the CLCL-LC resonant converter will have a coupling independent series resonant frequency given by:

$$f_s = \frac{1}{2\pi\sqrt{L_r C_r}} = \frac{1}{2\pi\sqrt{L_{rx}C_{rx}}}. \quad (10)$$

As for the parallel frequency of the CLCL-LC resonant converter, $L_m$ will join the resonance like LLC. The parallel resonance is formed by $L_r$ and $C_r$ in parallel, and will resonate with $C_{tx}$, $L_{rk}$, $L_m$ in series. The expression for this calculation is given by:

$$\frac{j\omega L_r \cdot \frac{1}{j\omega C_r}}{j\omega L_r + \frac{1}{j\omega C_r}} + j\omega L_{tk} + j\omega L_m + \frac{1}{j\omega C_{tx}} = 0. \quad (11)$$

There are two solutions of expression (11), which means two PRFs exist in CLCL-LC resonant converter. The solutions of expression (11) are relatively complicated and, thus, not shown here. From the result of the solutions, however, one PRF is present on the left side of the SRF and another PRF is present on the right side of the SRF. Intuitively, in low frequency ranges, the series branch ($L_{tk}$, $L_m$, $C_{tx}$) is capacitive, which can be equivalent to a capacitor $C_{eq}$. Therefore, the parallel frequency $$f_{p1} = \frac{1}{2\pi\sqrt{L_r(C_r + C_{eq})}}$$

is in the left side of $f_s$. In high frequency ranges, the series branch ($L_{tk}$, $L_m$, $C_{tx}$) is inductive, which can be equivalent to an inductor $L_{eq}$. So the parallel frequency $$f_{p2} = \frac{1}{2\pi\sqrt{(L_r // L_{eq})C_r}}$$

is in the right side of $f_s$.

Figure 19:
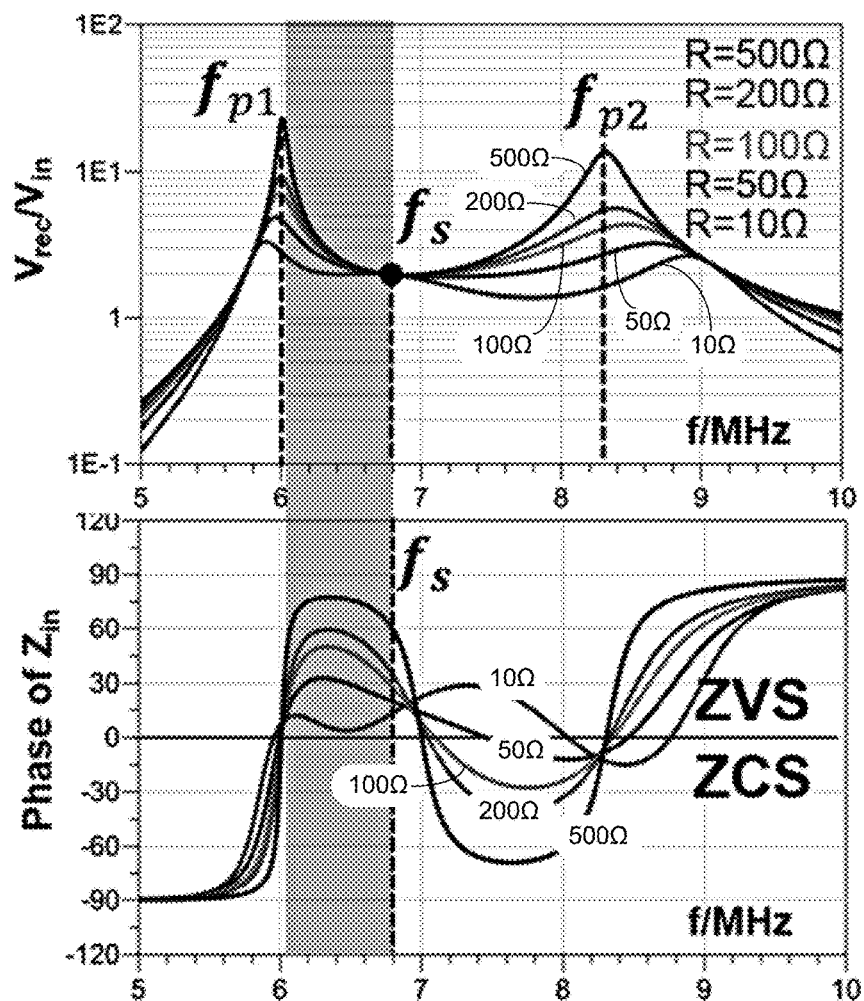
FIGS. 19 and 20 illustrate voltage gain and phase of input impedance curves for different load resistances and resonant couplings of the resonant converter shown in FIG. 16 according to various aspects of the embodiments described herein.
Figure 20:
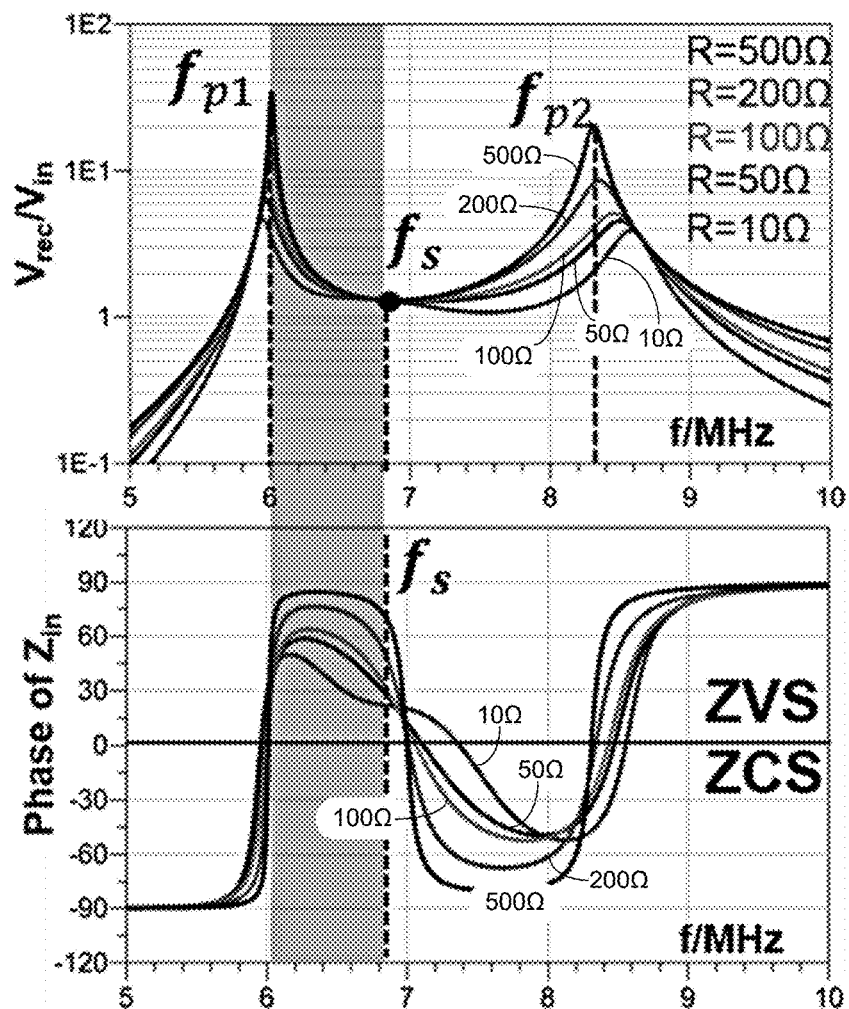

The voltage gain and phase of input impedance curves of the CLCL-LC resonant converter shown in FIG. 16 with different loads and for different couplings are shown in FIGS. 19 and 20. The k=0.4 case of coupling is shown in FIG. 19, and the k=0.2 case of coupling is shown in FIG. 20.

As demonstrated by FIGS. 19 and 20, a coupling independent SRF with ZVS operation is achieved with the CLCL-LC resonant converter topology. The entire shaded region can be selected as the operation region. From the gain curve, there are two PRFs around the fixed SRF, with one PRF on the left side and the other PRF on the right side of the SRF. With this type gain characteristics, fixed SRF with ZVS operation can be achieved, which is an important concept in the design of coupling independent resonance frequency in variable coupling applications.

Figure 21:
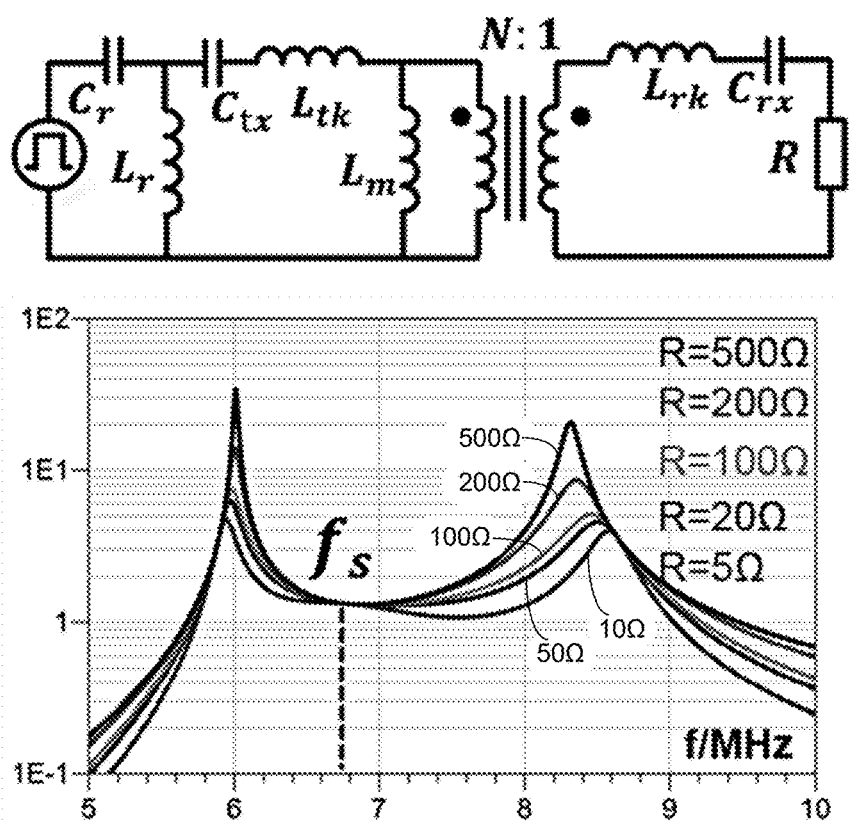
FIGS. 21-25 illustrate other example resonant converter topologies and gain curve characteristics according to various aspects of the embodiments described herein.

In extension to the CLCL-LC resonant converter topology shown in FIG. 16, other topologies of resonant converters with coupling independent resonance and ZVS operation can be found. Some example resonant converter topologies and gain curve characteristics of that type are shown in FIGS. 21-25. FIG. 21 is the CLCL-LC resonant converter topology (similar to that shown in FIG. 16), which is used as a reference for the other topologies.

Figure 22:
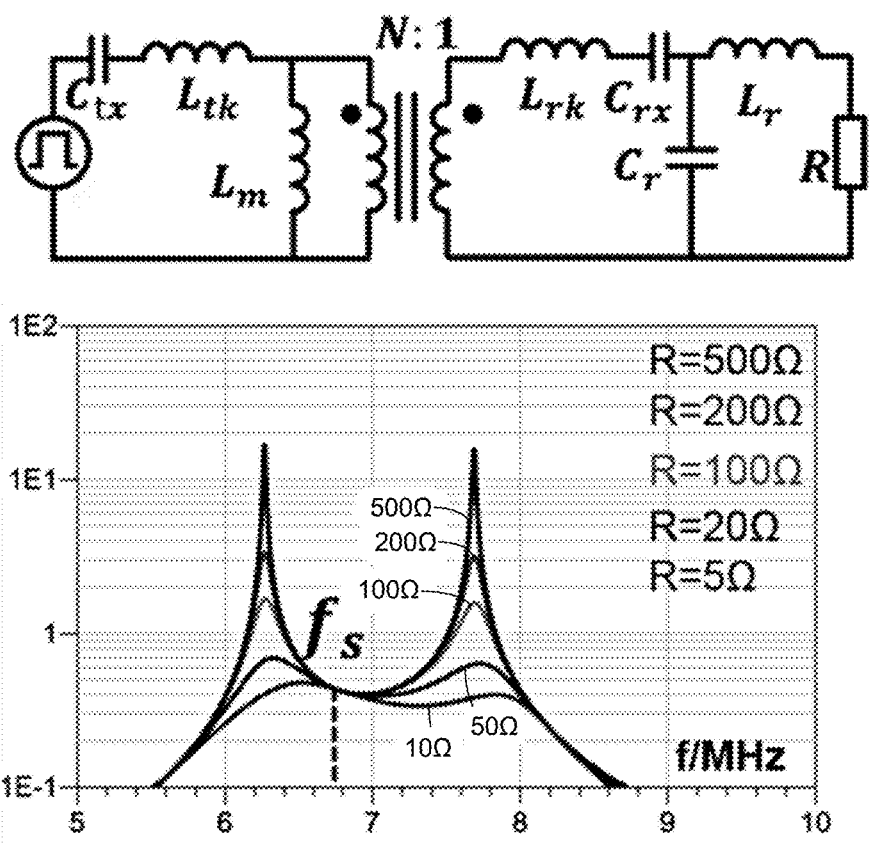
Figure 23:
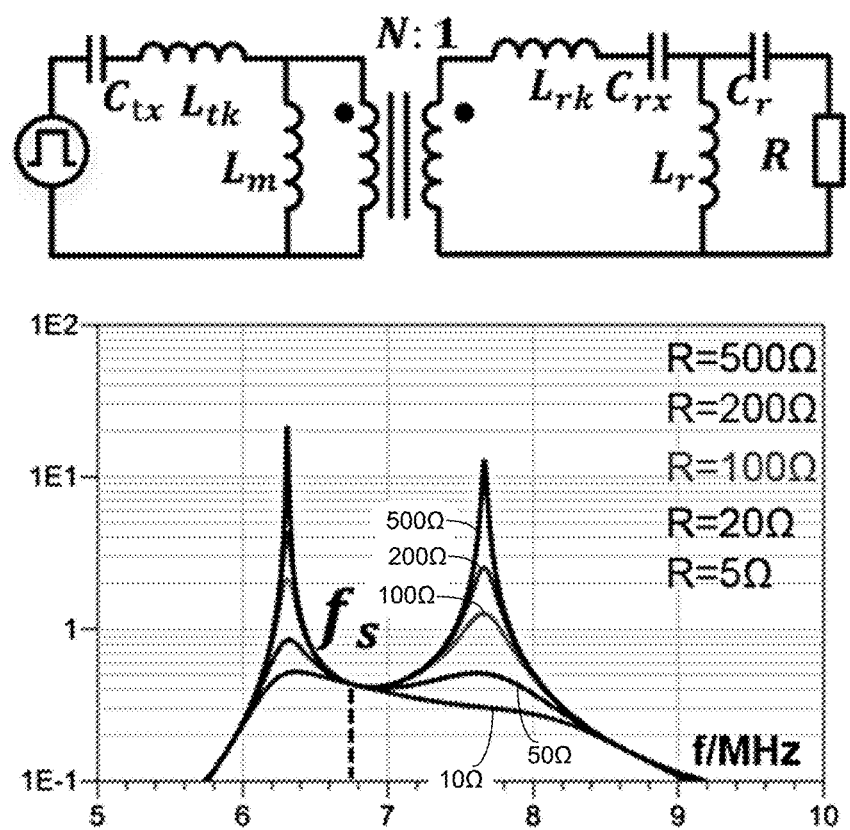
Figure 24:
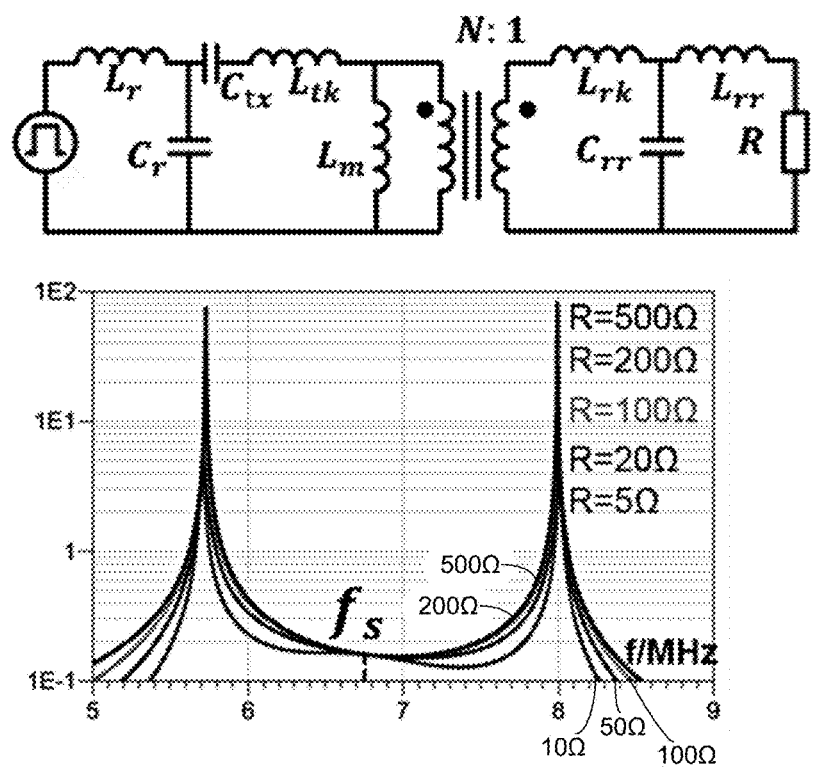
Figure 25:
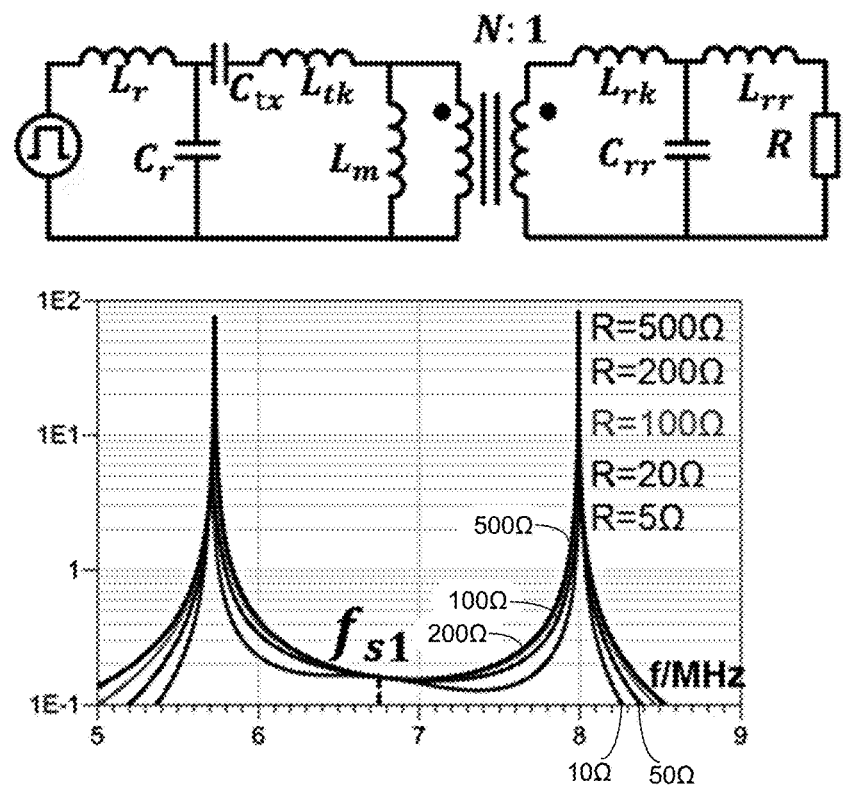

The other resonant converter topologies shown in FIGS. 22-25 have the same order as the CLCL-LC resonant converter topology in FIG. 21. FIG. 22 is a LCCL-LC resonant converter topology, FIG. 23 is a LC-LCCL resonant converter topology. Further, with the addition of more passive components, there are other resonant converter topologies with coupling independent resonance and ZVS operation. One such resonant converter topology having higher order than the CLCL-LC resonant converter topology is shown in FIG. 24. FIG. 25 is a LCCL-LCL resonant converter topology. In all these resonant converter topologies, a fixed SRF is created in the center of two PRFs in gain characteristics. With this type of gain characteristics, coupling independent operation region with ZVS operation can be obtained.

The above-described examples of the present disclosure are merely possible examples of implementations set forth for a clear understanding of the principles of the disclosure. Many variations and modifications can be made without departing substantially from the spirit and principles of the disclosure. All such modifications and variations are intended to be included herein within the scope of this disclosure and protected by the following claims.

Therefore, the following is claimed:

1. An omnidirectional wireless power transfer system, comprising:
    a plurality of resonant tank circuits electrically coupled to a power generator;
    a receptacle comprising a plurality of coils arranged for omnidirectional power transfer to an electronic device placed with the receptacle, each of the plurality of coils being electrically coupled to one of the plurality of resonant tank circuits; and
    a controller configured to activate individual ones of the resonant tank circuits with different voltages or currents to wirelessly transmit power through one or more of the plurality of coils to provide omnidirectional power transfer to the electronic device.

2. The omnidirectional wireless power transfer system according to claim 1, wherein:
    the receptacle comprises a bowl having the plurality of coils arranged in or on side and bottom surfaces of the bowl; and
    the plurality of coils are arranged to provide multidirectional magnetic field distribution.

3. The omnidirectional wireless power transfer system according to claim 2, wherein the controller is further configured to activate individual ones of the resonant tank circuits with different voltages or currents over time to generate omnidirectional field distribution over the surfaces of the receptacle.

4. The omnidirectional wireless power transfer system according to claim 2, wherein the controller is further configured to activate individual ones of the resonant tank circuits with different voltages or currents over time to generate omnidirectional field distribution over the bottom surfaces.

5. The omnidirectional wireless power transfer system according to claim 1, wherein the controller is further configured to sense a level of power transferred to the electronic device by individual ones of the plurality of resonant tank circuits to identify a coefficient of power transfer between individual ones of the plurality of resonant tank circuits and the electronic device.

6. The omnidirectional wireless power transfer system according to claim 1, wherein the controller is further configured to modulate a supply of power provided to individual ones of the plurality of resonant tank circuits in at least one of amplitude or phase to generate an omnidirectional field distribution.

7. The omnidirectional wireless power transfer system according to claim 1, wherein the plurality of resonant tank circuits each comprises at least one resonant converter topology for coupling independent resonance and zero voltage switching (ZVS).

8. The omnidirectional wireless power transfer system according to claim 1, further comprising:
    the electronic device, the electronic device comprising a receiver-side resonant tank circuit for near-field resonant inductive coupling with one or more of the plurality of resonant tank circuits and one or more of the plurality of coils.

9. The omnidirectional wireless power transfer system according to claim 8, wherein at least one of the plurality of resonant tank circuits and the receiver-side resonant tank circuit each comprises a resonant converter topology for coupling independent resonance and zero voltage switching (ZVS).

10. The omnidirectional wireless power transfer system according to claim 8, wherein the at least one of the plurality of resonant tank circuits and the receiver-side resonant tank circuit exhibit gain characteristics comprising one series resonance frequency positioned between two parallel resonant frequencies.

11. The omnidirectional wireless power transfer system according to claim 8, wherein the at least one of the plurality of resonant tank circuits comprises a CLCL resonant converter topology, and the receiver-side resonant tank circuit comprises an LC resonant converter topology.

12. The omnidirectional wireless power transfer system according to claim 8, wherein the at least one of the plurality of resonant tank circuits and the receiver-side resonant tank circuit comprise at least one of a LCCL-LC, LC-LCCL, CLCL-LC, or LCCL-LCL resonant converter topology.

13. A resonant circuit with coupling independent resonance and zero voltage switching characteristics, comprising:
    a parallel resonant cell;
    a zero voltage switching branch; and
    a series resonant cell.

14. The resonant circuit according to claim 13, wherein the parallel resonant cell and the series resonant cell form a coupling independent resonance for system operation.

15. The resonant circuit according to claim 13, wherein the zero voltage switching branch ensures a primary switching device achieves zero voltage switching at a coupling independent resonant frequency.

16. The resonant circuit according to claim 13, wherein the parallel resonant cell provides constant current characteristics for a transmitter coil.

17. The resonant circuit according to claim 13, wherein, in gain characteristics, the resonant circuit includes one coupling independent series resonant frequency and two parallel resonant frequencies.

18. The resonant circuit according to claim 17, wherein, in gain characteristics, the series resonant frequency is between the two parallel resonant frequencies.

19. The resonant circuit according to claim 17, wherein the resonant circuit is not limited to wireless power transfer applications but can also be used in other variable coupling applications.

* * * * *